United States Patent
Zhong et al.

(10) Patent No.: US 12,516,041 B2
(45) Date of Patent: Jan. 6, 2026

(54) CRYSTAL FORMS OF GLP-1R AGONISTS AND USES THEREOF

(71) Applicant: QILU REGOR THERAPEUTICS INC., Shanghai (CN)

(72) Inventors: Wenge Zhong, Thousand Oaks, CA (US); Wei Guo, Shanghai (CN); Zheng Jane Li, Sherman, CT (US); Xiawei Jiang, Zhejiang (CN); Pengyuan Chen, Zhejiang (CN)

(73) Assignee: QILU REGOR THERAPEUTICS INC., Shanghai (CN)

( * ) Notice: Subject to any disclaimer, the term of this patent is extended or adjusted under 35 U.S.C. 154(b) by 468 days.

(21) Appl. No.: 18/031,380

(22) PCT Filed: Oct. 13, 2021

(86) PCT No.: PCT/CN2021/123387
§ 371 (c)(1),
(2) Date: Apr. 12, 2023

(87) PCT Pub. No.: WO2022/078352
PCT Pub. Date: Apr. 21, 2022

(65) Prior Publication Data
US 2023/0382899 A1    Nov. 30, 2023

(30) Foreign Application Priority Data
Oct. 14, 2020  (WO) ................ PCT/CN2020/120814

(51) Int. Cl.
C07D 405/14    (2006.01)

(52) U.S. Cl.
CPC ........ C07D 405/14 (2013.01); *C07B 2200/13* (2013.01)

(58) Field of Classification Search
CPC .................................................. C07D 405/14
See application file for complete search history.

(56) References Cited

U.S. PATENT DOCUMENTS

| 10,954,221 B2 * | 3/2021 | Zhong .................. C07D 471/04 |
| 2018/0170908 A1 | 6/2018 | Aspnes et al. |

FOREIGN PATENT DOCUMENTS

| JP | 2011-513431 A | 4/2011 |
| JP | 2021-528394 A | 10/2021 |
| JP | 2022-508203 A | 1/2022 |
| JP | 2022-527607 A | 6/2022 |
| WO | 2018/109607 A1 | 6/2018 |
| WO | 2020/207474 A1 | 10/2020 |

OTHER PUBLICATIONS

International Search Report and Written Opinion for Application No. PCT/CN2021123387, dated Jan. 4, 2022, 12 pages.

* cited by examiner

*Primary Examiner* — John S Kenyon
*Assistant Examiner* — Rehana Ismail
(74) *Attorney, Agent, or Firm* — McCarter & English, LLP; Yu Lu; Wei Song

(57) ABSTRACT

Crystalline forms of Compound (A) represented by the following structural formula, and their corresponding pharmaceutical compositions, are disclosed. The crystalline forms are characterized by a variety of properties and physical measurements. Methods of preparing specific crystalline forms are also disclosed. The present disclosure also provides methods of treating or preventing diseases or conditions such as type 2 diabetes mellitus, pre-diabetes, obesity, non-alcoholic fatty liver disease, non-alcoholic steatohepatitis, and cardiovascular disease in a subject.

(A)

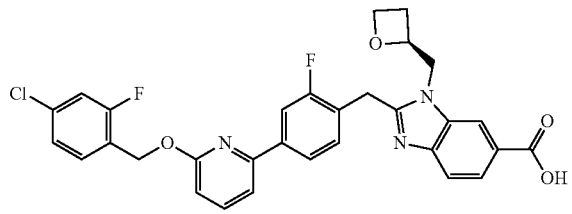

20 Claims, 10 Drawing Sheets

CRYSTAL FORMS OF GLP-1R AGONISTS AND USES THEREOF

CROSS REFERENCE TO RELATED APPLICATIONS

This application is a national stage application, filed under 35 U.S.C. § 371, of International Application No. PCT/CN2021/123387, filed on Oct. 13, 2021, which claims the benefit of and priority to International Application No. PCT/CN2020/120814, filed on Oct. 14, 2020. The entire contents of the aforementioned applications are incorporated herein by reference.

BACKGROUND

GLP-1 is a 30 amino acid long incretin hormone secreted by the L-cells in the intestine in response to ingestion of food. GLP-1 has been shown to stimulate insulin secretion in a physiological and glucose-dependent manner, decrease glucagon secretion, inhibit gastric emptying, decrease appetite, and stimulate proliferation of beta-cells. In non-clinical experiments GLP-1 promotes continued beta-cell competence by stimulating transcription of genes important for glucose-dependent insulin secretion and by promoting beta-cell neogenesis (Meier et al., *Biodrugs.* 17(2): 93-102, 2013).

In a healthy individual, GLP-1 plays an important role regulating post-prandial blood glucose levels by stimulating glucose-dependent insulin secretion by the pancreas resulting in increased glucose absorption in the periphery. GLP-1 also suppresses glucagon secretion, leading to reduced hepatic glucose output. In addition, GLP-1 delays gastric emptying and slows small bowel motility delaying food absorption. In people with T2DM, the normal post-prandial rise in GLP-1 is absent or reduced (Vilsboll et al., *Diabetes.* 50: 609-613, 2001).

Hoist (*Physiol. Rev.* 87: 1409, 2007) and Meier (*Nat. Rev. Endocrinol.* 8: 728, 2012) describe that GLP-1 receptor agonists, such as GLP-1, liraglutide and exendin-4, have 3 major pharmacological activities to improve glycemic control in patients with T2DM by reducing fasting and postprandial glucose (FPG and PPG): (i) increased glucose-dependent insulin secretion (improved first- and second-phase), (ii) glucagon suppressing activity under hyperglycemic conditions, (iii) delay of gastric emptying rate resulting in retarded absorption of meal-derived glucose.

International Patent Application No. PCT/CN2020/084203, the entire teachings of which are incorporated herein by reference, discloses highly potent GLP-1 agonists. The structures of one agonist disclosed therein, referred to herein as "Compound A", is shown below:

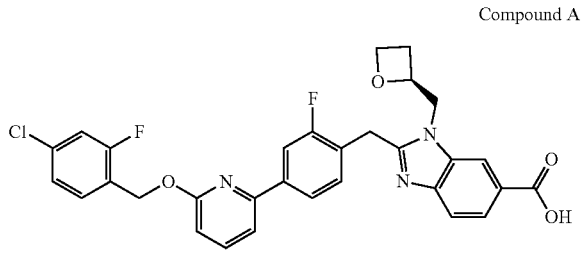 [SMILES: O=C(O)c1ccc2nc(Cc3ccc(-c4cccc(OCc5ccc(Cl)cc5F)n4)cc3F)n(C[C@@H]3CCO3)c2c1]

Compound A

The chemical name of Compound A is (S)-2-(4-(6-((4-chloro-2-fluorobenzyl)oxy) pyridin-2-yl)-2-fluorobenzyl)-1-(oxetan-2-ylmethyl)-1H-benzo[d]imidazole-6-carboxylic acid.

The successful development of pharmaceutically active agents, such as Compound A, typically requires the identification of a solid form with properties that enable ready isolation and purification following synthesis, that are amendable to large scale manufacture, that can be stored for extended periods of time with minimal absorption of water, decomposition or transformation into other solid forms, that are suitable for formulation and that can be readily absorbed following administration to the subject (e.g., are soluble in water and in gastric fluids).

SUMMARY

It has now also been found that three new crystalline forms of Compound A free acid, which can be obtained under well-defined conditions to provide desired crystalline forms (see Examples 2, and 5-7). These four forms have a high melting point. Among them, crystalline Form I of Compound A free acid is slightly hygroscopic, and physically and chemically stable at 60° C./capped and 40° C./75% RH (open) for 12 days, In one aspect, the present disclosure provides crystalline Form I of Compound A free acid.

In another aspect, the present disclosure provides crystalline Form II of Compound A free acid.

In another aspect, the present disclosure provides crystalline Form III of Compound A free acid.

In another aspect, the present disclosure provides crystalline Form IV of Compound A free acid.

In another aspect, the present disclosure provides a pharmaceutical composition comprising crystalline Form I of Compound A free acid (or crystalline Form II of Compound A free acid or crystalline Form III of Compound A free acid) and a pharmaceutically acceptable carrier.

The present disclosure provides a method of treating cardiometabolic and associated diseases, administering to a subject in need of such treatment a therapeutically effective amount of the crystalline forms (Form I, II, III, or IV) disclosed herein or the corresponding pharmaceutical compositions.

The present disclosure also provides a use of the crystalline forms (Form I, II, III, or IV) of the disclosure or the pharmaceutical composition thereof comprising the same in any of the methods of the disclosure described above. In one embodiment, provided is the crystalline forms (Form I, II, III, or IV) of the disclosure or a pharmaceutical composition thereof comprising the same for use in any of the method of the disclosure described herein. In another embodiment, provided is use of the crystalline forms (Form I, II, III, or IV) of the disclosure or a pharmaceutical composition thereof comprising the same for the manufacture of a medicament for any of the method of the disclosure described.

The present disclosure also provides methods to prepare compound A and its crystalline forms (Form I, II, III, or IV).

It should be understood that any embodiment of the present disclosure, including those described only in the Examples or claims, or only in one section of the specification, can be combined with one or more additional embodiments of the present disclosure, to the extent that such combinations are not expressly disclaimed or are improper.

DETAILED DESCRIPTION

The present disclosure is directed to novel crystalline forms of Compound A free acid.

"Hydrated form" refers to a crystalline form of Compound A free acid where water is combined with Compound (A) free acid in a stoichiometric ratio (e.g., a molar ratio of Compound A:water 1:1, 1:1.5, or 1:2) as an integral part of the solid or a crystal. "Unhydrated form" refers to a form which has no stoichiometric ratio between water and the free acid of Compound A, and water is not substantially (e.g., less that 10% by weight by Karl Fischer analysis) present in the solid form. The new solid forms disclosed in the present disclosure include hydrated forms and unhydrated forms.

As used herein, "crystalline" refers to a solid having a crystal structure wherein the individual molecules have a highly homogeneous regular three dimensional configuration.

The disclosed crystalline Compound A free acid can be crystals of a single crystal form or a mixture of crystals of different single crystalline forms. A single crystal form means the Compound A free acid is a single crystal or a plurality of crystals in which each crystal has the same crystal form.

For the crystalline forms of Compound A free acid disclosed herein, at least a particular percentage by weight of Compound A free acid is in a single crystal form. Particular weight percentages include 85%, 86%, 87%, 88%, 89%, 90%, 91%, 92%, 93%, 94%, 95%, 96%, 97%, 98%, 99%, 99.5%, 99.9%, or a weight percentage of 70%-75%, 75%-80%, 80%-85%, 85%-90%, 90%-95%, 95%-100%, 70-80%, 80-90%, 90-100% by weight of Compound A free acid is in a single crystal form. It is to be understood that all values and ranges between these values and ranges are meant to be encompassed by the present disclosure.

When the crystalline Compound A free acid is defined as a specified percentage of one particular crystal form of Compound A free acid, the remainder is made up of amorphous form and/or crystal forms other than the one or more particular forms that are specified. Examples of single crystal forms include Form I of Compound A free acid, Form II of Compound A free acid, Form III of Compound A free acid, and Form IV of Compound A free acid characterized by one or more properties as discussed herein.

Compound A has a chiral center. Crystalline forms of Compound A free acid disclosed herein are at least 80%, 90%, 99% or 99.9% by weight pure relative to the other stereoisomers, i.e., the ratio of the weight of the stereoisomer over the weight of all the stereoisomers.

Characterization of Crystalline Form I of Compound A Free Acid

Figure 1:
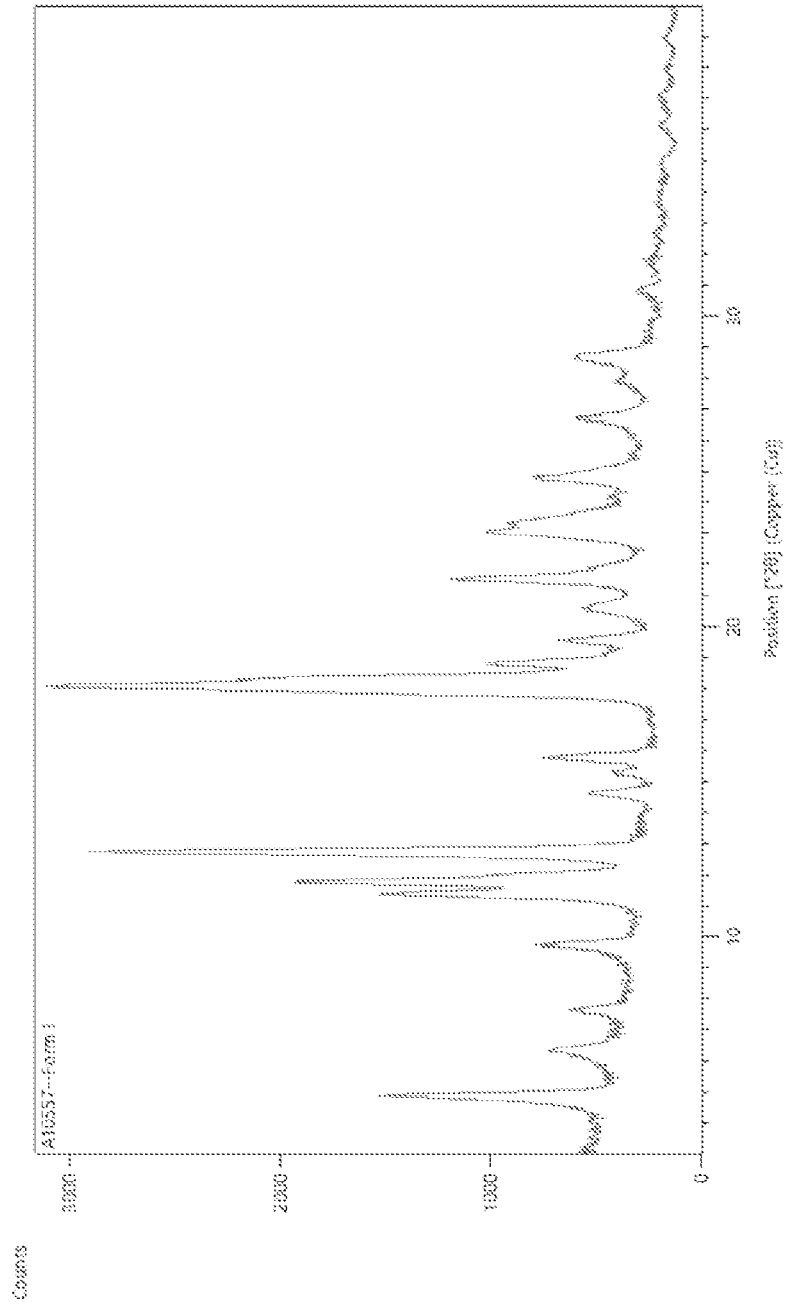
FIG. 1 shows the X-ray Powder Diffraction (XRPD) pattern of crystalline form I of Compound A free acid.

In one embodiment, 1:1 Compound A free acid is a single crystalline form, Form I, characterized by an X-ray powder diffraction pattern which comprises peaks at 11.4°, 12.7°, 18.1°, and 18.3°±0.2 in 2θ. In another embodiment, Form I is characterized by an X-ray powder diffraction pattern which further comprises one or more peaks at 4.9°, 11.8°, and 21.5°±0.2 in 2θ. In yet another embodiment, Form I is characterized by an X-ray powder diffraction pattern which further comprises one or more peaks at 15.8°, 18.8°, and 23.0°±0.2 in 2θ. In yet another embodiment, Form I is characterized by an X-ray powder diffraction pattern which comprises peaks at 4.9°, 11.4°, 11.8°, 12.7°, 15.8°, 18.1°, 18.3°, 18.8°, 21.5°, and 23.0°±0.2 in 2θ. In yet another embodiment, Form I is characterized by an X-ray powder diffraction pattern substantially similar to FIG. 1.

In another embodiment, Form I of Compound A Free Acid is characterized by differential scanning calorimeter (DSC) peak phase transition temperatures of 200±3° C. (e.g., 199.7° C.).

Characterization of Crystalline Form II of Compound A Free Acid

Figure 4:
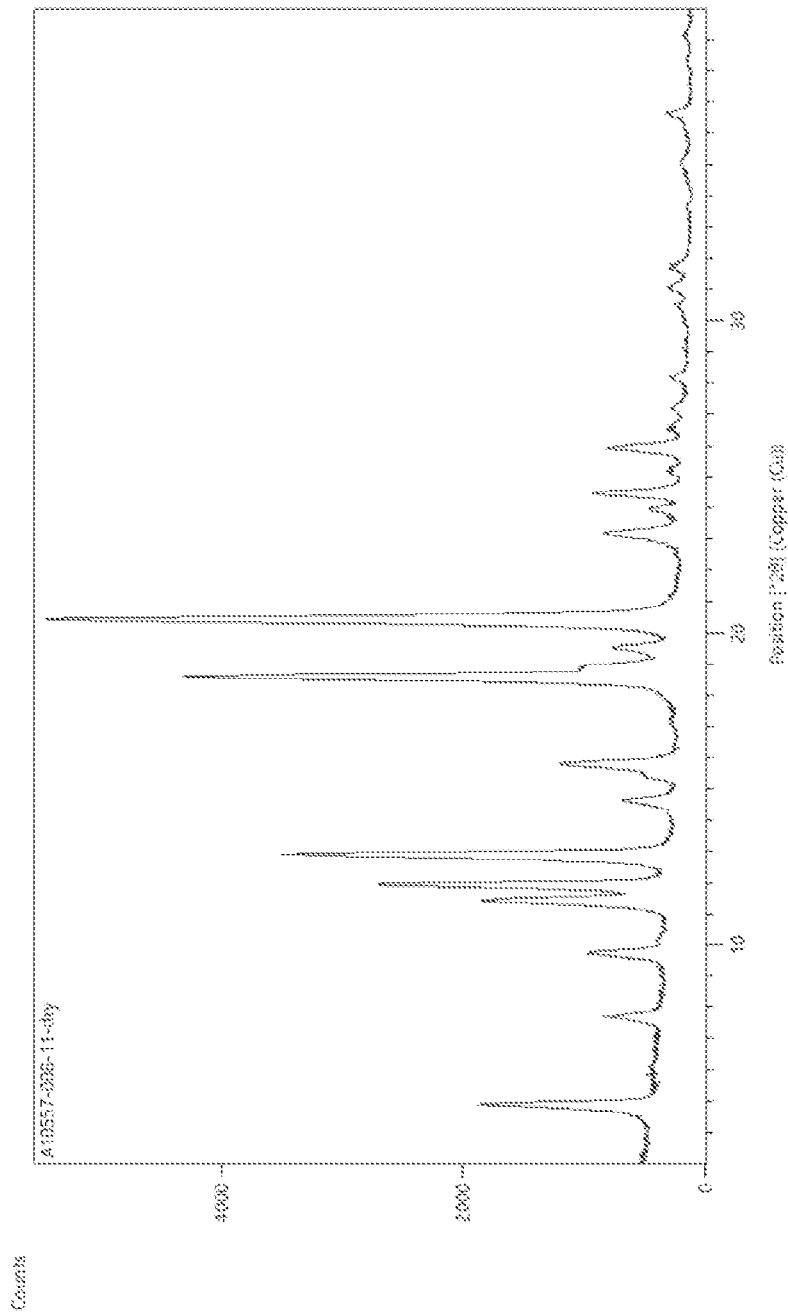
FIG. 4 shows the X-ray Powder Diffraction (XRPD) pattern of crystalline form II of Compound A free acid.

In one embodiment, Compound A free acid is a single crystalline form, Form II, characterized by an X-ray powder diffraction pattern which comprises peaks at 11.4°, 12.0°, 12.9°, 18.6°, and 20.4° in 2θ. In another embodiment, Form II is characterized by an X-ray powder diffraction pattern which further comprises a peak at 25.9°±0.2 in 2θ. In another embodiment, Form II is characterized by an X-ray powder diffraction pattern which further comprises one or more peaks at 4.9°, 7.7°, 15.8°, and 25.9°±0.2 in 2θ. In yet another embodiment, Form II is characterized by an X-ray powder diffraction pattern which comprises peaks at 4.9°, 7.7°, 11.4°, 12.0°, 12.9°, 15.8°, 18.6°, 20.4°, and 25.9° in 2θ. In another embodiment, Form II is characterized by an X-ray powder diffraction pattern which the X-ray powder diffraction pattern does not comprise peaks at 18.1°±0.2 in 2θ. In another embodiment, Form II is characterized by an X-ray powder diffraction pattern which the X-ray powder diffraction pattern does not comprise peaks at 21.5°±0.2 in 2θ. In yet another embodiment, Form II is characterized by an X-ray powder diffraction pattern substantially similar to FIG. 4.

In another embodiment, Form II of Compound A Free Acid is characterized by differential scanning calorimeter (DSC) peak phase transition temperatures of 205±3° C. (e.g., 204.6° C.).

Characterization of Crystalline Form III of Compound A Free Acid

Figure 6:
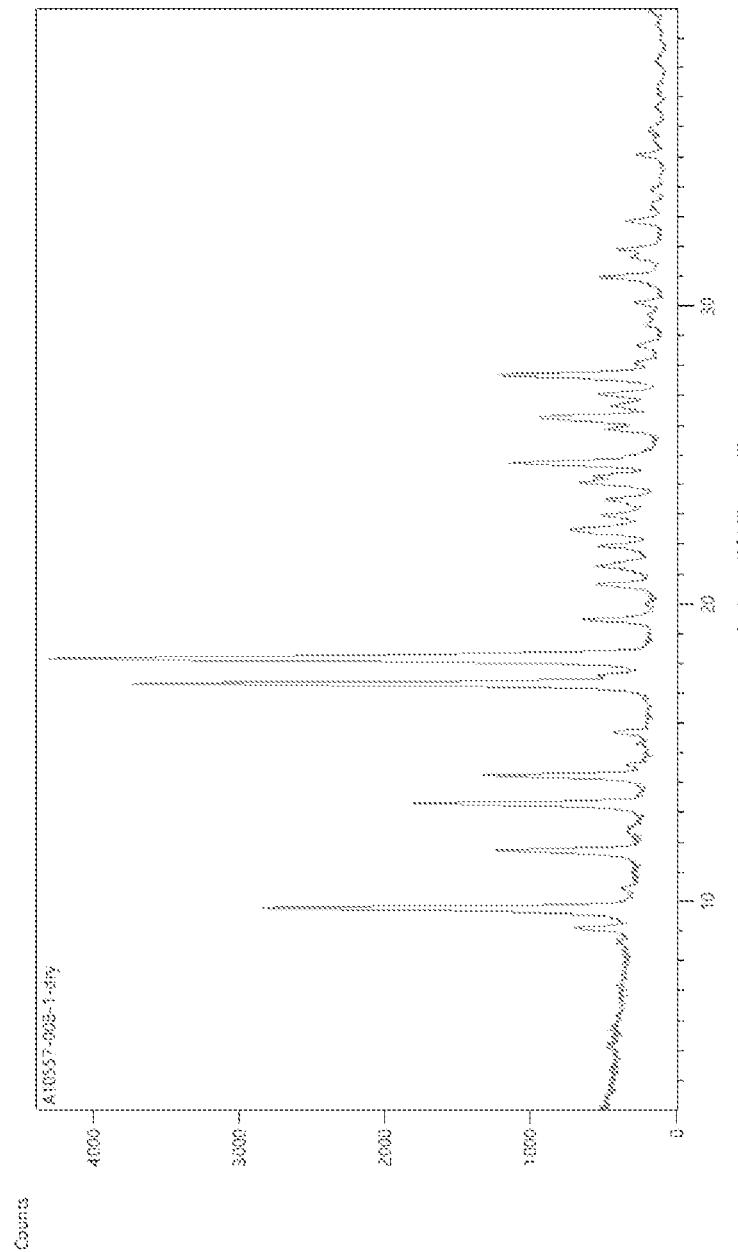
FIG. 6 shows the X-ray Powder Diffraction (XRPD) pattern of crystalline form III of Compound A free acid.

In one embodiment, Compound A free acid is a single crystalline form, Form III, characterized by an X-ray powder diffraction pattern which comprises peaks at 9.8°, 13.3°, 17.3°, and 18.1° in 2θ. In another embodiment, Form III is characterized by an X-ray powder diffraction pattern which further comprises one or more peaks at 11.7°, 14.2°, 24.7°, 26.3 and 27.7°±0.2 in 2θ. In yet another embodiment, Form III is characterized by an X-ray powder diffraction pattern which comprises peaks at 9.8°, 11.7°, 13.3°, 14.2°, 17.3°, 18.1°, 24.7°, 26.3°, and 27.7° in 2θ. In yet another embodiment, Form III is hydrate. A molar ratio of Compound A:water is between 1:1 and 1:2, for example, 1:1.5. In yet another embodiment, Form III is characterized by an X-ray powder diffraction pattern substantially similar to FIG. 6.

In another embodiment, Form III of Compound A Free Acid is characterized by differential scanning calorimeter (DSC) peak phase transition temperatures of 204±3° C. (e.g., 204.4° C.).

Characterization of Crystalline Form IV of Compound A Free Acid

Figure 8:
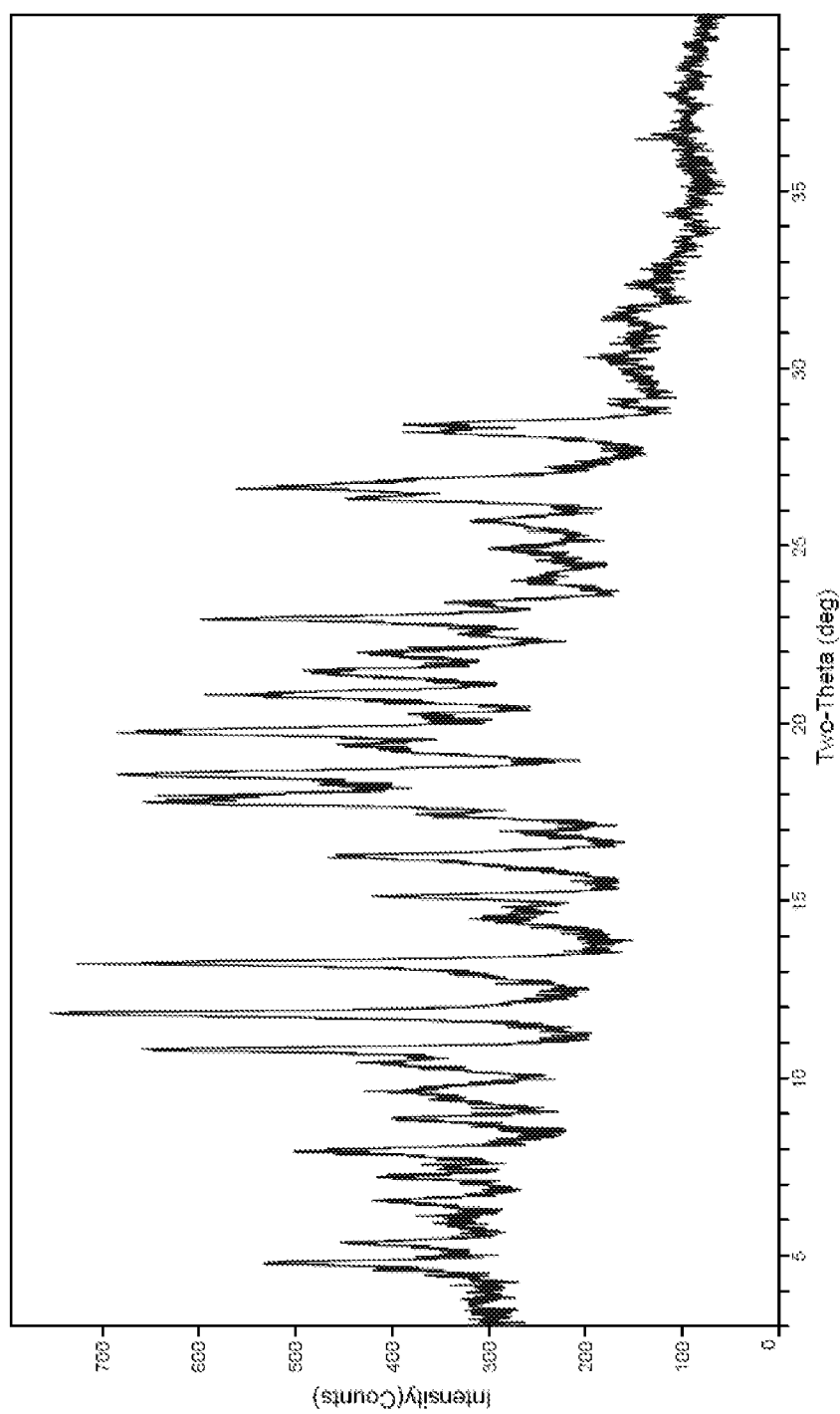
FIG. 8 shows the X-ray Powder Diffraction (XRPD) pattern of crystalline form IV of Compound A free acid.

In one embodiment, Compound A free acid is a single crystalline form, Form IV, characterized by an X-ray powder diffraction pattern which comprises peaks at 10.8°, 11.8°, 13.2°, 17.8°, 18.6°, and 19.7° in 2θ. In another embodiment, Form IV is characterized by an X-ray powder diffraction pattern which further comprises one or more peaks at 10.8°, 11.8°, 13.2°, 17.8°, 18.6°, 19.7°, 22.9°, and 26.6°±0.2 in 2θ. In yet another embodiment, Form IV is characterized by an X-ray powder diffraction pattern which comprises peaks at 10.8°, 11.8°, 13.2°, 17.8°, 18.6°, 19.7°, 22.9°, 26.6°, 28.2°, and 28.4° in 2θ. In yet another embodiment, Form IV is an anhydrate. In yet another embodiment, Form IV is characterized by an X-ray powder diffraction pattern substantially similar to FIG. 8.

In another embodiment, Form IV of Compound A Free Acid is characterized by differential scanning calorimeter (DSC) peak phase transition temperatures of 196±3° C. (e.g., 196.8° C.).

It is well known in the crystallography art that, for any given crystal form, an angular peak position may vary slightly due to factors such as temperature variation, sample displacement, and the presence or absence of an internal standard. In the present disclosure, the variability of an angular peak position is ±0.2 in 2θ. In addition, the relative peak intensities for a given crystal form may vary due to differences in crystallite sizes and non-random crystallite orientations in sample preparation for XRPD analysis. It is well known in the art that this variability will account for the above factors without hindering the unequivocal identification of a crystal form.

Pharmaceutical Compositions

In another embodiment, disclosed herein are pharmaceutical compositions. Such pharmaceutical compositions comprise a crystalline form of Compound A free acid described herein and a pharmaceutically acceptable carrier. Other pharmacologically active substances can also be present.

As used herein, "pharmaceutically acceptable carrier" includes any and all solvents, dispersion media, coatings, antibacterial and antifungal agents, isotonic and absorption delaying agents, and the like that are physiologically compatible. Examples of pharmaceutically acceptable carriers include one or more of water, saline, phosphate buffered saline, dextrose, glycerol, ethanol and the like, as well as combinations thereof, and may include isotonic agents, for example, sugars, sodium chloride, or polyalcohols such as mannitol, or sorbitol in the composition. Pharmaceutically acceptable substances such as wetting agents or minor amounts of auxiliary substances such as wetting or emulsifying agents, preservatives or buffers, which enhance the shelf life or effectiveness of the antibody or antibody portion.

The compositions of the present disclosure may be in a variety of forms. These include, for example, liquid, semi-solid and solid dosage forms, such as liquid solutions (e.g., injectable and infusible solutions), dispersions or suspensions, tablets, pills, powders, liposomes and suppositories. The form depends on the intended mode of administration and therapeutic application.

Typical compositions are in the form of injectable or infusible solutions, such as compositions similar to those used for passive immunization of humans with antibodies in general. One mode of administration is parenteral (e.g. intravenous, subcutaneous, intraperitoneal, intramuscular). In another embodiment, the antibody is administered by intravenous infusion or injection. In yet another embodiment, the antibody is administered by intramuscular or subcutaneous injection.

Oral administration of a solid dose form may be, for example, presented in discrete units, such as hard or soft capsules, pills, cachets, lozenges, or tablets, each containing a predetermined amount of at least one compound of the present disclosure. In another embodiment, the oral administration may be in a powder or granule form. In another embodiment, the oral dose form is sub-lingual, such as, for example, a lozenge. In such solid dosage forms, the compounds of any one of the formulae described above are ordinarily combined with one or more adjuvants. Such capsules or tablets may contain a controlled release formulation. In the case of capsules, tablets, and pills, the dosage forms also may comprise buffering agents or may be prepared with enteric coatings.

In another embodiment, oral administration may be in a liquid dose form. Liquid dosage forms for oral administration include, for example, pharmaceutically acceptable emulsions, solutions, suspensions, syrups, and elixirs containing inert diluents commonly used in the art (e.g., water). Such compositions also may comprise adjuvants, such as wetting, emulsifying, suspending, flavoring (e.g., sweetening), and/or perfuming agents.

In another embodiment, the present disclosure comprises a parenteral dose form.

"Parenteral administration" includes, for example, subcutaneous injections, intravenous injections, intraperitoneally, intramuscular injections, intrasternal injections, and infusion. Injectable preparations (i.e., sterile injectable aqueous or oleaginous suspensions) may be formulated according to the known art using suitable dispersing, wetting agents, and/or suspending agents.

In another embodiment, the present disclosure comprises a topical dose form.

"Topical administration" includes, for example, transdermal administration, such as via transdermal patches or iontophoresis devices, intraocular administration, or intranasal or inhalation administration. Compositions for topical administration also include, for example, topical gels, sprays, ointments, and creams. A topical formulation may include a compound which enhances absorption or penetration of the active ingredient through the skin or other affected areas. When the compounds of this present disclosure are administered by a transdermal device, administration will be accomplished using a patch either of the reservoir and porous membrane type or of a solid matrix variety. Typical formulations for this purpose include gels, hydrogels, lotions, solutions, creams, ointments, dusting powders, dressings, foams, films, skin patches, wafers, implants, sponges, fibres, bandages and microemulsions. Liposomes may also be used. Typical carriers include alcohol, water, mineral oil, liquid petrolatum, white petrolatum, glycerin, polyethylene glycol and propylene glycol. Penetration enhancers may be incorporated—see, for example, Finnin and Morgan, *J. Pharm. Sci.*, 88: 955-958, 1999.

Formulations suitable for topical administration to the eye include, for example, eye drops wherein the compound of this present disclosure is dissolved or suspended in a suitable carrier. A typical formulation suitable for ocular or aural administration may be in the form of drops of a micronized suspension or solution in isotonic, pH-adjusted, sterile saline. Other formulations suitable for ocular and aural administration include ointments, biodegradable (i.e., absorbable gel sponges, collagen) and non-biodegradable (i.e., silicone) implants, wafers, lenses and particulate or vesicular systems, such as niosomes or liposomes. A polymer such as crossed linked polyacrylic acid, polyvinyl alcohol, hyaluronic acid, a cellulosic polymer, for example, hydroxypropylmethylcellulose, hydroxyethylcellulose, or methylcellulose, or a heteropolysaccharide polymer, for example, gelan gum, may be incorporated together with a preservative, such as benzalkonium chloride. Such formulations may also be delivered by iontophoresis.

For intranasal administration or administration by inhalation, the compounds of the present disclosure are conveniently delivered in the form of a solution or suspension from a pump spray container that is squeezed or pumped by the patient or as an aerosol spray presentation from a pressurized container or a nebulizer, with the use of a suitable propellant. Formulations suitable for intranasal administration are typically administered in the form of a dry powder (either alone, as a mixture, for example, in a dry blend with lactose, or as a mixed component particle, for example, mixed with phospholipids, such as phosphatidylcholine) from a dry powder inhaler or as an aerosol spray from a pressurized container, pump, spray, atomizer (preferably an atomizer using electrohydrodynamics to produce a fine mist), or nebulizer, with or without the use of a suitable propellant, such as 1,1,1,2-tetrafluoroethane or 1,1,1,2,3,3,3-heptafluoropropane. For intranasal use, the powder may comprise a bioadhesive agent, for example, chitosan or cyclodextrin.

In another embodiment, the present disclosure comprises a rectal dose form. Such rectal dose form may be in the form of, for example, a suppository. Cocoa butter is a traditional suppository base, but various alternatives may be used as appropriate.

Other carrier materials and modes of administration known in the pharmaceutical art may also be used. Pharmaceutical compositions of the present disclosure may be prepared by any of the well-known techniques of pharmacy, such as effective formulation and administration procedures.

The above considerations in regard to effective formulations and administration procedures are well known in the art and are described in standard textbooks. Formulation of drugs is discussed in, for example, Hoover, John E., *Remington's Pharmaceutical Sciences*, Mack Publishing Co., Easton, Pa., 1975; Liberman et al., Eds., *Pharmaceutical Dosage Forms*, Marcel Decker, New York, N.Y., 1980; and Kibbe et al., Eds., *Handbook of Pharmaceutical Excipients* (3$^{rd}$ Ed.), American Pharmaceutical Association, Washington, 1999.

Methods of Treatment

A "subject" is a mammal, preferably a human, but can also be an animal in need of veterinary treatment, e.g., companion animals (e.g., dogs, cats, and the like), farm animals (e.g., cows, sheep, pigs, horses, and the like) and laboratory animals (e.g., rats, mice, guinea pigs, and the like).

A "treatment" regime of a subject with an effective amount of the compound of the present disclosure may consist of a single administration, or alternatively comprise a series of applications. The length of the treatment period depends on a variety of factors, such as the severity of the disease, the age of the subject, the concentration and the activity of the compounds of the present disclosure, or a combination thereof. It will also be appreciated that the effective dosage of the compound used for the treatment or prophylaxis may increase or decrease over the course of a particular treatment or prophylaxis regime. Changes in dosage may result and become apparent by standard diagnostic assays known in the art. In some instances, chronic administration may be required.

In one aspect, the present disclosure provides crystalline forms of Compound A free acid, as described herein, for use in the prevention and/or treatment of, for example, cardiometabolic and associated diseases discussed herein, including T2DM, pre-diabetes, NASH, and cardiovascular disease.

In another aspect, the present disclosure provides a method of treating a disease or condition for which an agonist of GLP-1R is indicated, in a subject in need of such prevention and/or treatment, comprising administering to the subject a therapeutically effective amount of a crystalline form of Compound A free acid, as described herein.

In another aspect, the present disclosure provides a use of a crystalline form of Compound A free acid, as described herein, for the manufacture of a medicament for treating a disease or condition for which an agonist of the GLP-1R is indicated.

In another aspect, the present disclosure provides a crystalline form of Compound A free acid, as described herein, for use in the treatment of a disease or condition for which an agonist of GLP-1R is indicated.

In another aspect, the present disclosure provides a pharmaceutical composition for the treatment of a disease or condition for which an agonist of the GLP-1R is indicated, comprising a crystalline form of Compound A free acid, as described herein.

The present disclosure also provides a pharmaceutical composition comprising a crystalline form of Compound A free acid, as described herein, for use in the treatment and/or prevention of cardiometabolic and associated diseases discussed herein, including T2DM, pre-diabetes, NASH, and cardiovascular disease.

In another aspect, the present disclosure provides a crystalline form of Compound A free acid, as described herein, for use in the treatment and/or treatment for cardiometabolic and associated diseases including diabetes (T1D and/or T2DM, including pre-diabetes), idiopathic T1D (Type 1b), latent autoimmune diabetes in adults (LADA), early-onset T2DM (EOD), youth-onset atypical diabetes (YOAD), maturity onset diabetes of the young (MODY), malnutrition-related diabetes, gestational diabetes, hyperglycemia, insulin resistance, hepatic insulin resistance, impaired glucose tolerance, diabetic neuropathy, diabetic nephropathy, kidney disease (e.g., acute kidney disorder, tubular dysfunction, proinflammatory changes to the proximal tubules), diabetic retinopathy, adipocyte dysfunction, visceral adipose deposition, sleep apnea, obesity (including hypothalamic obesity and monogenic obesity) and related comorbidities (e.g., osteoarthritis and urine incontinence), eating disorders (including binge eating syndrome, bulimia nervosa, and syndromic obesity such as Prader-Willi and Bardet-Biedl syndromes), weight gain from use of other agents (e.g., from use of steroids and antipsychotics), excessive sugar craving, dyslipidemia (including hyperlipidemia, hypertriglyceridemia, increased total cholesterol, high LDL cholesterol, and low HDL cholesterol), hyperinsulinemia, NAFLD (including related diseases such as steatosis, NASH, fibrosis, cirrhosis, and hepatocellular carcinoma), cardiovascular disease, atherosclerosis (including coronary artery disease), peripheral vascular disease, hypertension, endothelial dysfunction, impaired vascular compliance, congestive heart failure, myocardial infarction (e.g. necrosis and apoptosis), stroke, hemorrhagic stroke, ischemic stroke, traumatic brain injury, pulmonary hypertension, restenosis after angioplasty, intermittent claudication, post-prandial lipemia, metabolic acidosis, ketosis, arthritis, osteoporosis, Parkinson's Disease, left ventricular hypertrophy, peripheral arterial disease, macular degeneration, cataract, glomerulosclerosis, chronic renal failure, metabolic syndrome, syndrome X, premenstrual syndrome, angina pectoris, thrombosis, atherosclerosis, transient ischemic attacks, vascular restenosis, impaired glucose metabolism, conditions of impaired fasting plasma glucose, hyperuricemia, gout, erectile dysfunction, skin and connective tissue disorders, psoriasis, foot ulcerations, ulcerative colitis, hyper apo B lipoproteinemia, Alzheimer's Disease, schizophrenia, impaired cognition, inflammatory bowel disease, short bowel syndrome, Crohn's disease, colitis, irritable bowel syndrome, prevention or treatment of Polycystic Ovary Syndrome and treatment of addiction (e.g., alcohol and/or drug abuse).

In certain embodiments, the disease or disorder is obesity, eating disorders, weight gain from use of other agents, excessive sugar craving, and dyslipidemia.

In certain embodiments, the disease or disorder is obesity.

In certain embodiments, the disease or disorder is pre-diabetes.

In certain embodiments, the disease or disorder is T2DM.

In certain embodiments, the disease or disorder is NASH.

In certain embodiments, the disease or disorder is NAFLD.

In certain embodiments, the disease or disorder is a cardiovescular disease, such as hypertension.

In another aspect, the present disclosure provides a method of enhancing or stimulating GLP-1R-mediated cAMP signaling with reduced β-arrestin/arrestin-2 recruitment, comprising administering a compound of any one of the formulae described above (e.g., Formulae I, II-A, III-A, and IV-A), solvate, or hydrate thereof, as defined in any one of the embodiments described herein. This is partly based on the surprising finding that the compounds of the present disclosure, while being full agonists of GLP-1R-mediated cAMP signaling, are partial agonists of β-arrestin recruitment to activated GLP-1R, compared to the natural GLP-1R ligand GLP-1, in that maximal β-arrestin recruitment to activated GLP-1R by the compounds of the present disclosure is lower than maximal β-arrestin recruitment by GLP-1. Such partial and/or biased agonists of GLP-1R for cAMP signaling may provide a more sustained cAMP signaling activity for better efficacy and lowered side effects.

Thus, the method of the present disclosure may be advantageously used for the treatment of any of the diseases or conditions described herein, such as type II diabetes (T2D) and related diseases.

In certain embodiments, the treatment elicits a glycemic benefit without concomitant increase, or at least reduced increase, in a GI side effect such as nausea, vomiting, or diarrhea. In certain embodiments, the treatment has greater tolerability compared to a control treatment that has normal or enhanced β-arrestin recruitment (such as β-arrestin recruitment by GLP-1).

Administration and Dosing

Typically, a compound of the present disclosure is administered in an amount effective to treat a condition as described herein.

The compounds of the present disclosure are administered by any suitable route in the form of a pharmaceutical composition adapted to such a route, and in a dose effective for the treatment intended. The compounds of the present disclosure may be administered orally, rectally, vaginally, parenterally, or topically.

The compounds of the present disclosure may be administered orally. Oral administration may involve swallowing, so that the compound enters the gastrointestinal tract, or buccal or sublingual administration may be employed by which the compound enters the bloodstream directly from the mouth.

In another embodiment, the compounds of the present disclosure may also be administered directly into the bloodstream, into muscle, or into an internal organ. Suitable means for parenteral administration include intravenous, intraarterial, intraperitoneal, intrathecal, intraventricular, intraurethral, intrasternal, intracranial, intramuscular and subcutaneous. Suitable devices for parenteral administration include needle (including microneedle) injectors, needle-free injectors and infusion techniques.

In another embodiment, the compounds of the present disclosure may also be administered topically to the skin or mucosa, that is, dermally or transdermally. In another embodiment, the compounds of the present disclosure can also be administered intranasally or by inhalation. In another embodiment, the compounds of the present disclosure may be administered rectally or vaginally. In another embodiment, the compounds of the present disclosure may also be administered directly to the eye or ear.

The dosage regimen for the compounds of the present disclosure and/or compositions containing said compounds is based on a variety of factors, including the type, age, weight, sex and medical condition of the patient; the severity of the condition; the route of administration; and the activity of the particular compound employed. Thus the dosage regimen may vary widely. In one embodiment, the total daily dose of a compound of the present disclosure is typically from about 0.001 to about 100 mg/kg (i.e., mg compound of the present disclosure per kg body weight) for the treatment of the indicated conditions discussed herein. In another embodiment, total daily dose of the compound of the present disclosure is from about 0.01 to about 30 mg/kg, and in another embodiment, from about 0.03 to about 10 mg/kg, and in yet another embodiment, from about 0.1 to about 3 mg/kg. It is not uncommon that the administration of the compounds of the present disclosure will be repeated a plurality of times in a day (typically no greater than 4 times). Multiple doses per day typically may be used to increase the total daily dose, if desired. In certain embodiments, the patient is a human, such as a human with one of the treatable disease indications or disorders described elsewhere herein.

For oral administration, the compositions may be provided in the form of tablets containing 0.1, 0.5, 1.0, 2.5, 5.0, 10.0, 15.0, 25.0, 30.0 50.0, 75.0, 100, 125, 150, 175, 200, 250 and 500 milligrams of the active ingredient for the symptomatic adjustment of the dosage to the patient. A medicament typically contains from about 0.01 mg to about 500 mg of the active ingredient, or in another embodiment, from about 1 mg to about 100 mg of active ingredient. Intravenously, doses may range from about 0.01 to about 10 mg/kg/minute during a constant rate infusion.

Suitable subjects or patients according to the present disclosure include mammalian subjects, including human, or non-human mammals such as primates, rodents (mice, rats, hamsters, rabbits etc). In one embodiment, humans are suitable subjects. Human subjects may be of either gender and at any stage of development. In certain embodiments, the human is a child less than 18 years old, 15 years old or around 14 years old, 12 years old, 10 years old, or less than 5 years old.

Co-Administration

The compounds of the present disclosure can be used alone, or in combination with other therapeutic agents. The present disclosure provides any of the uses, methods or compositions as defined herein wherein the compound of any embodiment of any one of the formulae described above herein, or pharmaceutically acceptable solvate of said compound, is used in combination with one or more other therapeutic agent discussed herein.

The administration of two or more compounds "in combination" means that all of the compounds are administered closely enough in time that each may generate a biological effect in the same time frame. The presence of one agent may alter the biological effects of the other compound(s). The two or more compounds may be administered simultaneously, concurrently or sequentially. Additionally, simultaneous administration may be carried out by mixing the compounds prior to administration or by administering the compounds at the same point in time but as separate dosage forms at the same or different site of administration.

The phrases "concurrent administration," "co-administration," "simultaneous administration," and "administered simultaneously" mean that the compounds are administered in combination.

In another embodiment, the present disclosure provides methods of treatment that include administering compounds of the present disclosure in combination with one or more other pharmaceutical agents, wherein the one or more other pharmaceutical agents may be selected from the agents discussed herein.

In one embodiment, the compounds of this present disclosure are administered with an anti-diabetic agent including but not limited to a biguanide (e.g., metformin), a sulfonylurea (e.g., tolbutamide, glibenclamide, gliclazide, chlorpropamide, tolazamide, acetohexamide, glycopyramide, glimepiride, or glipizide), a thiazolidinedione (e.g., pioglitazone, rosiglitazone, or lobeglitazone), a glitazar (e.g., saroglitazar, aleglitazar, muraglitazar or tesaglitazar), a meglitinide (e.g., nateglinide, repaglinide), a dipeptidyl peptidase 4 (DPP-4) inhibitor (e.g., sitagliptin, vildagliptin, saxagliptin, linagliptin, gemigliptin, anagliptin, teneligliptin, alogliptin, trelagliptin, dutogliptin, or omarigliptin), a glitazone (e.g., pioglitazone, rosiglitazone, balaglitazone, rivoglitazone, or lobeglitazone), a sodium-glucose linked transporter 2 (SGLT2) inhibitor (e.g., empagliflozin, canagliflozin, dapagliflozin, ipragliflozin, Ipragliflozin, tofogliflozin, sergliflozin etabonate, remogliflozin etabonate, or ertugliflozin), an SGLTL1 inhibitor, a GPR40 agonist (FFAR1/FFA1 agonist, e.g. fasiglifam), glucose-dependent insulinotropic peptide (GIP) and analogues thereof, an alpha glucosidase inhibitor (e.g. voglibose, acarbose, or miglitol), or an insulin or an insulin analogue, including the pharmaceutically acceptable salts of the specifically named agents and the pharmaceutically acceptable solvates of said agents and salts.

In another embodiment, the compounds of this present disclosure are administered with an anti-obesity agent including but not limited to peptide YY or an analogue thereof, a neuropeptide Y receptor type 2 (NPYR2) agonist, a NPYR1 or NPYR5 antagonist, a cannabinoid receptor type 1 (CB1R) antagonist, a lipase inhibitor (e.g., orlistat), a human proislet peptide (HIP), a melanocortin receptor 4 agonist (e.g., setmelanotide), a melanin concentrating hormone receptor 1 antagonist, a farnesoid X receptor (FXR) agonist (e.g. obeticholic acid), zonisamide, phentermine (alone or in combination with topiramate), a norepinephrine/dopamine reuptake inhibitor (e.g., buproprion), an opioid receptor antagonist (e.g., naltrexone), a combination of norepinephrine/dopamine reuptake inhibitor and opioid receptor antagonist (e.g., a combination of bupropion and naltrexone), a GDF-15 analog, sibutramine, a cholecystokinin agonist, amylin and analogues thereof (e.g., pramlintide), leptin and analogues thereof (e.g., metroleptin), a serotonergic agent (e.g., lorcaserin), a methionine aminopeptidase 2 (MetAP2) inhibitor (e.g., beloranib or ZGN-1061), phendimetrazine, diethylpropion, benzphetamine, an SGLT2 inhibitor (e.g., empagliflozin, canagliflozin, dapagliflozin, ipragliflozin, Ipragliflozin, tofogliflozin, sergliflozin etabonate, remogliflozin etabonate, or ertugliflozin), an SGLTL1 inhibitor, a dual SGLT2/SGLT1 inhibitor, a fibroblast growth factor receptor (FGFR) modulator, an AMP-activated protein kinase (AMPK) activator, biotin, a MAS receptor modulator, or a glucagon receptor agonist (alone or in combination with another GLP-1R agonist, e.g., liraglutide, exenatide, dulaglutide, albiglutide, lixisenatide, or semaglutide), including the pharmaceutically acceptable salts of the specifically named agents and the pharmaceutically acceptable solvates of said agents and salts.

In another embodiment, the compounds of this present disclosure are administered with an agent to treat NASH including but not limited to PF-05221304, an FXR agonist (e.g., obeticholic acid), a PPAR α/δ agonist (e.g., elafibranor), a synthetic fatty acid-bile acid conjugate (e.g., aramchol), a caspase inhibitor (e.g., emricasan), an anti-lysyl oxidase homologue 2 (LOXL2) monoclonal antibody (e.g., simtuzumab), a galectin 3 inhibitor (e.g., GR-MD-02), a MAPK5 inhibitor (e.g., GS-4997), a dual antagonist of chemokine receptor 2 (CCR2) and CCR5 (e.g., cenicriviroc), a fibroblast growth factor 21 (FGF21) agonist (e.g., BMS-986036), a leukotriene D4 (LTD4) receptor antagonist (e.g., tipelukast), a niacin analogue (e.g., ARI 3037MO), an ASBT inhibitor (e.g., volixibat), an acetyl-CoA carboxylase (ACC) inhibitor (e.g., NDI 010976), a ketohexokinase (KHK) inhibitor, a diacylglyceryl acyltransferase 2 (DGAT2) inhibitor, a CB1 receptor antagonist, an anti-CB1R antibody, or an apoptosis signal-regulating kinase 1 (ASK1) inhibitor, including the pharmaceutically acceptable salts of the specifically named agents and the pharmaceutically acceptable solvates of said agents and salts.

These agents and compounds of the present disclosure can be combined with pharmaceutically acceptable vehicles such as saline, Ringer's solution, dextrose solution, and the like. The particular dosage regimen, i.e., dose, timing and repetition, will depend on the particular individual and that individual's medical history.

Acceptable carriers, excipients, or stabilizers are nontoxic to recipients at the dosages and concentrations employed, and may comprise buffers such as phosphate, citrate, and other organic acids; salts such as sodium chloride; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens, such as methyl or propyl paraben; catechol; resorcinol; cyclohexanol; 3-pentanol; and m-cresol); low molecular weight (less than about 10 residues) polypeptides; proteins, such as serum albumin, gelatin, or Igs; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g., Zn-protein complexes); and/or non-ionic surfactants such as TWEEN™, PLURONICS™ or polyethylene glycol (PEG). Liposomes containing these agents and/or compounds of the present disclosure are prepared by methods known in the art, such as described in U.S. Pat. Nos. 4,485,045 and 4,544,545. Liposomes with enhanced circulation time are disclosed in U.S. Pat. No. 5,013,556. Particularly useful liposomes can be generated by the reverse phase evaporation method with a lipid composition comprising phosphatidylcholine, cholesterol and PEG-derivatized phosphatidylethanolamine (PEG-PE). Liposomes are extruded through filters of defined pore size to yield liposomes with the desired diameter.

These agents and/or the compounds of the present disclosure may also be entrapped in microcapsules prepared, for example, by coacervation techniques or by interfacial polymerization, for example, hydroxymethylcellulose or gelatin-microcapsules and poly-(methylmethacrylate) microcapsules, respectively, in colloidal drug delivery systems (for example, liposomes, albumin microspheres, microemulsions, nano-particles and nanocapsules) or in macroemulsions. Such techniques are disclosed in Remington, *The Science and Practice of Pharmacy,* 20$^{th}$ Ed., Mack Publishing (2000).

Sustained-release preparations may be used. Suitable examples of sustained-release preparations include semipermeable matrices of solid hydrophobic polymers containing the compound of any one of the formulae described above, which matrices are in the form of shaped articles, e.g., films, or microcapsules. Examples of sustained-release matrices include polyesters, hydrogels (for example, poly (2-hydroxyethyl-methacrylate), or 'poly(vinylalcohol)), polylactides (U.S. Pat. No. 3,773,919), copolymers of L-glutamic acid and 7 ethyl-L-glutamate, non-degradable ethylene-vinyl acetate, degradable lactic acid-glycolic acid copolymers such as those used in LUPRON DEPOT™ (injectable microspheres composed of lactic acid-glycolic acid copolymer and leuprolide acetate), sucrose acetate isobutyrate, and poly-D-(−)-3-hydroxybutyric acid.

The formulations to be used for intravenous administration must be sterile. This is readily accomplished by, for example, filtration through sterile filtration membranes. Compounds of the present disclosure are generally placed into a container having a sterile access port, for example, an intravenous solution bag or vial having a stopper pierceable by a hypodermic injection needle.

Suitable emulsions may be prepared using commercially available fat emulsions, such as Intralipid™, Liposyn™, Infonutrol™, Lipofundin™ and Lipiphysan™. The active ingredient may be either dissolved in a pre-mixed emulsion composition or alternatively it may be dissolved in an oil (e.g., soybean oil, safflower oil, cottonseed oil, sesame oil, corn oil or almond oil) and an emulsion formed upon mixing with a phospholipid (e.g., egg phospholipids, soybean phospholipids or soybean lecithin) and water. It will be appreciated that other ingredients may be added, for example glycerol or glucose, to adjust the tonicity of the emulsion. Suitable emulsions will typically contain up to 20% oil, for example, between 5 and 20%. The fat emulsion can comprise fat droplets between 0.1 and 1.0 μm, particularly 0.1 and 0.5 μm, and have a pH in the range of 5.5 to 8.0.

The emulsion compositions can be those prepared by mixing a compound of the present disclosure with Intralipid™ or the components thereof (soybean oil, egg phospholipids, glycerol and water).

Compositions for inhalation or insufflation include solutions and suspensions in pharmaceutically acceptable, aqueous or organic solvents, or mixtures thereof, and powders. The liquid or solid compositions may contain suitable pharmaceutically acceptable excipients as set out above. In some embodiments, the compositions are administered by the oral or nasal respiratory route for local or systemic effect. Compositions in preferably sterile pharmaceutically acceptable solvents may be nebulised by use of gases. Nebulised solutions may be breathed directly from the nebulising device or the nebulising device may be attached to a face mask, tent or intermittent positive pressure breathing machine. Solution, suspension or powder compositions may be administered, preferably orally or nasally, from devices which deliver the formulation in an appropriate manner.

Kits

Another aspect of the present disclosure provides kits comprising a crystalline form of Compound A free acid described above or pharmaceutical compositions comprising the crystalline form of Compound A free acid described above of the present disclosure. A kit may include, in addition to the compound of any one of the formulae described above, of the present disclosure or pharmaceutical composition thereof, diagnostic or therapeutic agents. A kit may also include instructions for use in a diagnostic or therapeutic method. In some embodiments, the kit includes the compound of any one of the formulae described above, or a pharmaceutical composition thereof and a diagnostic agent. In other embodiments, the kit includes the compound of any one of the formulae described above, or a pharmaceutical composition thereof.

In yet another embodiment, the present disclosure comprises kits that are suitable for use in performing the methods of treatment described herein. In one embodiment, the kit contains a first dosage form comprising one or more of the compounds of the present disclosure in quantities sufficient to carry out the methods of the present disclosure. In another embodiment, the kit comprises one or more compounds of the present disclosure in quantities sufficient to carry out the methods of the present disclosure and a container for the dosage and a container for the dosage.

Preparation

The compounds of any one of the formulae described above, may be prepared by the general and specific methods described below, using the common general knowledge of one skilled in the art of synthetic organic chemistry. Such common general knowledge can be found in standard reference books such as *Comprehensive Organic Chemistry*, Ed. Barton and Ollis, Elsevier; *Comprehensive Organic Transformations: A Guide to Functional Group Preparations*, Larock, John Wiley and Sons; and *Compendium of Organic Synthetic Methods*, Vol. I-XII (published by Wiley-Interscience). The starting materials used herein are commercially available or may be prepared by routine methods known in the art.

In the preparation of the compounds of any one of the formulae described above, it is noted that some of the preparation methods described herein may require protection of remote functionality (e.g., primary amine, secondary amine, carboxyl in any one of the formulae described above precursors). The need for such protection will vary depending on the nature of the remote functionality and the conditions of the preparation methods. The need for such protection is readily determined by one skilled in the art. The use of such protection/deprotection methods is also within the skill in the art. For a general description of protecting groups and their use, see Greene, *Protective Groups in Organic Synthesis*, John Wiley & Sons, New York, 1991.

For example, certain compounds contain primary amines or carboxylic acid functionalities which may interfere with reactions at other sites of the molecule if left unprotected. Accordingly, such functionalities may be protected by an appropriate protecting group which may be removed in a subsequent step. Suitable protecting groups for amine and carboxylic acid protection include those protecting groups commonly used in peptide synthesis (such as N-t-butoxy-carbonyl (Boc), benzyloxycarbonyl (Cbz), and 9-fluorenyl-methylenoxycarbonyl (Fmoc) for amines, and lower alkyl or benzyl esters for carboxylic acids) which are generally not chemically reactive under the reaction conditions described and can typically be removed without chemically altering other functionality in the any one of the formulae described above compounds.

The Schemes described below are intended to provide a general description of the methodology employed in the preparation of the compounds of the present disclosure. Some of the compounds of the present disclosure may contain single or multiple chiral centers with the stereochemical designation (R) or (S). It will be apparent to one skilled in the art that all of the synthetic transformations can be conducted in a similar manner whether the materials are enantioenriched or racemic. Moreover, the resolution to the desired optically active material may take place at any desired point in the sequence using well known methods such as described herein and in the chemistry literature.

Amine compounds prepared via methods described herein can be alkylated with a protected 2-bromoacetate in the presence of a suitable base such as $K_2CO_3$, $Et_3N$, NaH or LiHMDS in a polar aprotic solvent such as but not limited to DMF, DMAc, DMSO or NMP to deliver compounds. Standard ester hydrolysis can be performed to provide acids. If $Pg^2$ is t-butyl, standard acidic deprotection methods such as TFA/DCM, HCl/1,4-dioxane, HCl/EtOAc or other suitable conditions may be used to deliver acids.

EXPERIMENTAL

The solvent abbreviations are listed in the table below.

| No. | Solvent | Abbreviation |
|---|---|---|
| 1 | Methanol | MeOH |
| 2 | Ethanol | EtOH |
| 3 | Isopropyl alcohol | IPA |
| 4 | Butanone | MEK |
| 5 | Acetone | — |
| 6 | Ethyl acetate | EA |
| 7 | Isopropyl acetate | IPAC |
| 8 | Methyl tert-butyl ether | MTBE |
| 9 | Water | — |
| 10 | Dichloromethane | DCM |
| 11 | Acetonitrile | ACN |
| 12 | Toluene | Tol |
| 13 | Tetrahydrofuran | THF |
| 14 | Heptane | Hept |
| 15 | Dimethyl sulfoxide | DMSO |

Analysis Conditions

X-Ray Powder Diffraction (XRPD)

XRPD patterns were identified with an X-ray diffractometer (PANalytical Empyrean). The system was equipped with PIXcel[1D] detector. Samples were scanned from 3 to 40° 2θ, at a step size of 0.013° 2θ. The tube voltage and current were 45 KV and 40 mA, respectively.

| Parameters | Settings/Values |
|---|---|
| X-Ray wavelength | Cu: K-Alpha (λ = 1.5418 Å) |
| X-Ray tube setting | Voltage: 45 kV; Current: 40 mA |
| Scan scope | 3 to 40 deg |
| Sample rotation speed | 60 rpm |
| Scanning rate | 0.164 deg./s |

Differential Scanning Calorimetry (DSC)

DSC was performed using a Discovery DSC 250 (TA Instruments, US). The sample was placed into an aluminum pin-hole hermetic pan and the weight was accurately recorded. Then the sample was heated at a rate of 10° C./min from 25° C. to the final temperature.

Thermogravimetric Analysis (TGA)

TGA was carried out on a Discovery TGA 55 (TA Instruments, US). The sample was placed into a tared aluminum pan, automatically weighed, and inserted into the TGA furnace. The sample was heated at a rate of 10° C./min from RT to the final temperature (not set weight stabilization program and capped with pin hole).

Dynamic Vapor Sorption (DVS)

Moisture sorption/desorption data was collected on a Vsorp Dynamic Moisture Sorption Analyzer (ProUmid GmbH & Co. KG, Germany). The sample was placed into a tared sample chamber and automatically weighed.

Polarized Light Microscopy (PLM)

Light microscopy was performed using a Polarizing Microscope ECLIPSE LV100POL (Nikon, JPN).

[1]H-Nuclear Magnetic Resonance Spectroscopy ($^1$H-NMR)

$^1$H-NMR was performed using Bruker AVANCE III HD 300/400 equipped with automated sampler (Sample Xpress 60).

High Performance Liquid Chromatography (HPLC)

HPLC analysis was performed with an Agilent HPLC 1260 series instrument. HPLC method for stability and solubility testing is listed in the table below.

HPLC Method for Stability and Solubility Testing

| Column | Atlantis ® T3 4.6*150 mm*3 μm |
|---|---|
| Mobile Phase | A: 0.05% TFA in water |
| | B: ACN |
| Gradient (T/B %) | 0/10, 3/57, 12/59, 16/90, 16.1/10 |
| Column Temperature | 30° C. |
| Detector | DAD; 254 nm |
| Flow Rate | 1.0 mL/min |
| Injection Volume | 4 μL |
| Run Time | 16 min |
| Post Time | 2 min |
| Diluent | EtOH |

Example 1. Synthesis of (S)-2-(4-(6-((4-chloro-2-fluorobenzyl)oxy)pyridin-2-yl)-2-fluorobenzyl)-1-(oxetan-2-ylmethyl)-1H-benzo[d]imidazole-6-carboxylic Acid (Compound A)

Preparation Method A

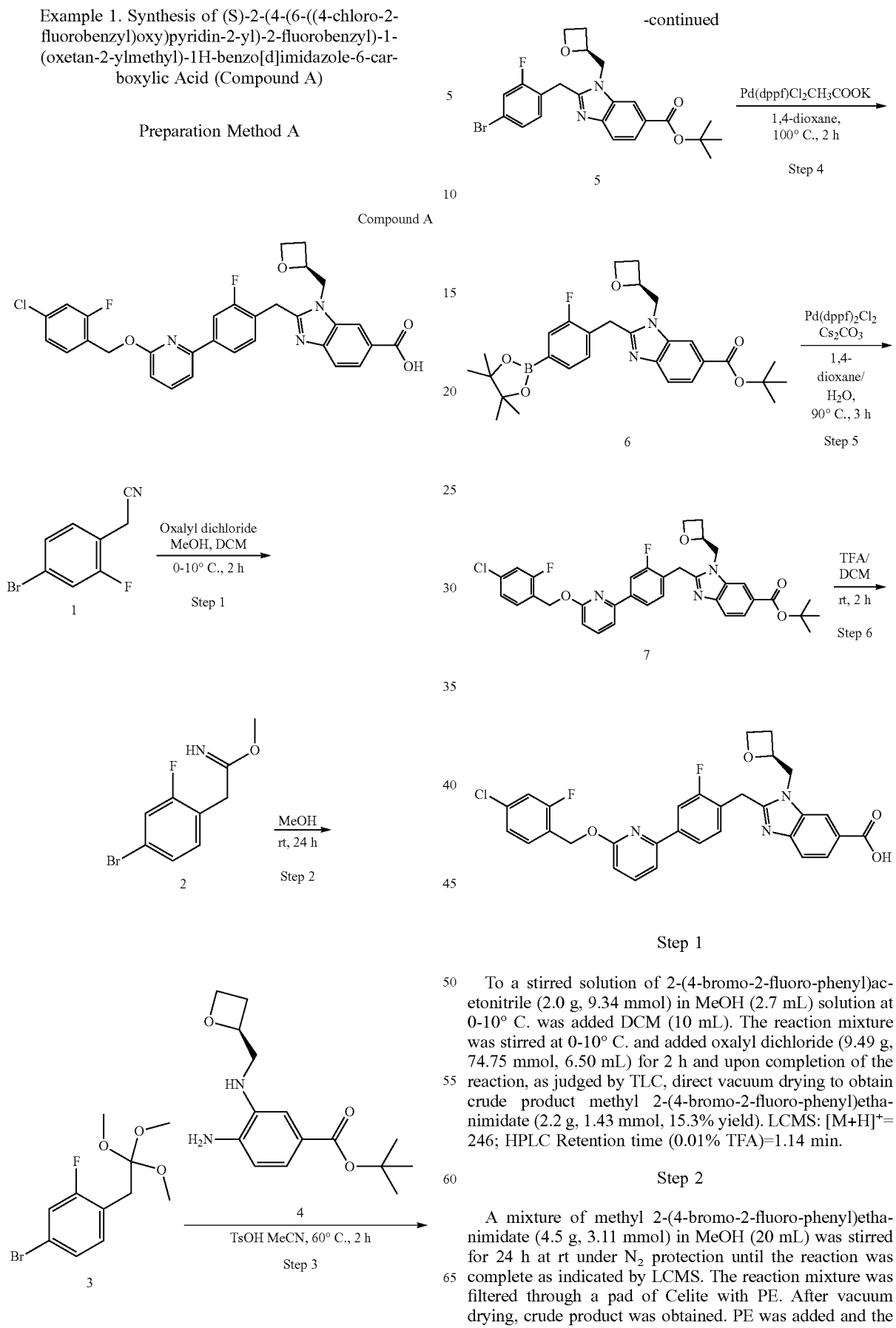

Step 1

To a stirred solution of 2-(4-bromo-2-fluoro-phenyl)acetonitrile (2.0 g, 9.34 mmol) in MeOH (2.7 mL) solution at 0-10° C. was added DCM (10 mL). The reaction mixture was stirred at 0-10° C. and added oxalyl dichloride (9.49 g, 74.75 mmol, 6.50 mL) for 2 h and upon completion of the reaction, as judged by TLC, direct vacuum drying to obtain crude product methyl 2-(4-bromo-2-fluoro-phenyl)ethanimidate (2.2 g, 1.43 mmol, 15.3% yield). LCMS: [M+H]$^+$= 246; HPLC Retention time (0.01% TFA)=1.14 min.

Step 2

A mixture of methyl 2-(4-bromo-2-fluoro-phenyl)ethanimidate (4.5 g, 3.11 mmol) in MeOH (20 mL) was stirred for 24 h at rt under N$_2$ protection until the reaction was complete as indicated by LCMS. The reaction mixture was filtered through a pad of Celite with PE. After vacuum drying, crude product was obtained. PE was added and the solid was filtered out to get filtrate. Repeat several times until no solid was obtained. The product 4-bromo-2-fluoro-1-(2,2,2-trimethoxyethyl)benzene (4.0 g, 2.87 mmol, 92.2% yield) was obtained as colorless liquid. HPLC Retention time (0.01% TFA)=1.89 min.

Step 3

A mixture of 4-bromo-2-fluoro-1-(2,2,2-trimethoxyethyl) benzene (2.10 g, 7.16 mmol), tert-butyl 4-amino-3-[[(2S)-oxetan-2-yl]methylamino]benzoate (1.00 g, 3.59 mmol), 4-methylbenzene sulfonic acid (185.6 mg, 1.08 mmol) in $CH_3CN$ (10 mL) was stirred for 2 h at 60° C. under $N_2$ protection until the reaction was completed as indicated by LCMS. The reaction mixture was filtered through a pad of Celite with EtOAc, and the combined organic layer was concentrated in vacuo, purified by silica gel chromatography (Hexanes/EtOAc=8:1) to give the desired product tert-butyl (S)-2-(4-bromo-2-fluorobenzyl)-1-(oxetan-2-ylmethyl)-1H-benzo[d]imidazole-6-carboxylate (1.13 g, 2.38 mmol, 66.2% yield) as pale yellow solid.
LCMS: $[M+H]^+$=475; HPLC Retention time (10 mM $NH_4HCO_3$)=2.05 min.

Step 4

To a suspension of tert-butyl (S)-2-(4-bromo-2-fluorobenzyl)-1-(oxetan-2-ylmethyl)-1H-benzo[d]imidazole-6-carboxylate (21.0 g, 44.18 mmol) in 1,4-dioxane (30 mL) was added 4,4,5,5-tetramethyl-2-(4,4,5,5-tetramethyl-1,3,2-dioxaborolan-2-yl)-1,3,2-dioxaborolane (13.46 g, 53.01 mmol), cyclopentyl(diphenyl)phosphane dichloropalladium iron (9.70 g, 13.25 mmol) and potassium acetate (8.67 g, 88.36 mmol, 5.52 mL). The mixture was stirred at 100° C. for 2 h under $N_2$. After completion of the reaction as judged by LCMS, the reaction mixture was used for next step directly. LCMS: $[M+H]^+$=523.0; HPLC Retention time (10 mM $NH_4HCO_3$)=2.17 min.

Step 5

A mixture of tert-butyl (S)-2-(2-fluoro-4-(4,4,5,5-tetramethyl-1,3,2-dioxaborolan-2-yl)benzyl)-1-(oxetan-2-ylmethyl)-1H-benzo[d]imidazole-6-carboxylate (80.0 mg, 52.07 μmol), 2-bromo-6-[(4-chloro-2-fluoro-phenyl) methoxy]pyridine (24.7 mg, 78.10 μmol), dicesium carbonate (50.9 mg, 156.20 μmol) and cyclopentyl(diphenyl)phosphane dichloropalladium iron (3.81 mg, 5.21 μmol) in 1,4-dioxane (8 mL) $H_2O$ (1 mL) was stirred for 3 h at 90° C. under $N_2$. Until the reaction was complete as indicated by LCMS, the reaction mixture was filtered through a pad of Celite with DCM. The combined organic layer was concentrated in vacuo to give the desired crude product tert-butyl (S)-2-(4-(6-((4-chloro-2-fluorobenzyl)oxy)pyridin-2-yl)-2-fluorobenzyl)-1-(oxetan-2-ylmethyl)-1H-benzo[d]imidazole-6-carboxylate (40 mg, 18.98 μmol, 36.5% yield) as pale yellow solid. LCMS: $[M+H]^+$=632; HPLC Retention time (0.01% TFA)=1.90 min.

Step 6

A mixture of tert-butyl (S)-2-(4-(6-((4-chloro-2-fluorobenzyl)oxy)pyridin-2-yl)-2-fluorobenzyl)-1-(oxetan-2-ylmethyl)-1H-benzo[d]imidazole-6-carboxylate (40 mg, 63.28 μmol), 2,2,2-trifluoroacetic acid (36.08 mg, 316.41 μmol, 24.38 μL) in DCM (8 mL) was stirred for 2 h at rt under $N_2$, until the reaction was complete as indicated by LCMS, the reaction mixture was filtered through a pad of Celite with EtOAc, and the combined organic layer was concentrated in vacuo. After completion of the reaction, the desired product (S)-2-(4-(6-((4-chloro-2-fluorobenzyl)oxy) pyridin-2-yl)-2-fluorobenzyl)-1-(oxetan-2-ylmethyl)-1H-benzo[d]imidazole-6-carboxylic acid (4.1 mg, 7.12 μmol, 11.3% yield) was obtained as pale white solid. LCMS: $[M+H]^+$=575.8; HPLC Retention time (10 mM $NH_4HCO_3$)= 1.65 min.
$^1H$ NMR (400 MHz, DMSO-d6) δ8.25-8.24 (brs, 1H), 7.96-7.75 (m, 4H), 7.69-7.57 (m, 3H), 7.50 (dd, J=10.0, 2.0 Hz, 1H), 7.43 (t, J=8.1 Hz, 1H), 7.32 (dd, J=8.2, 1.8 Hz, 1H), 6.88 (d, J=8.2 Hz, 1H), 5.52 (s, 2H), 5.04 (d, J=7.2 Hz, 1H), 4.73 (dd, J=15.5, 7.0 Hz, 1H), 4.60 (d, J=13.0 Hz, 1H), 4.54-4.46 (m, 2H), 4.37 (ddd, J=18.5, 11.9, 11.3 Hz, 2H), 2.70 (dd, J=12.1, 6.1 Hz, 1H), 2.41-2.29 (m,1H).

Preparation Method B

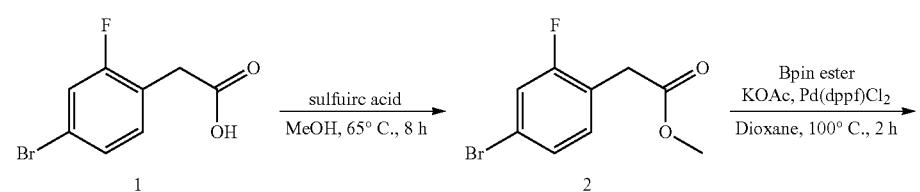

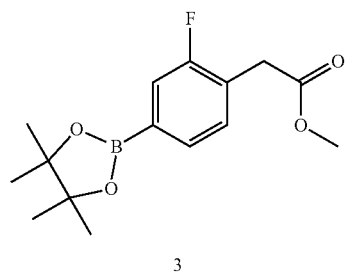

-continued
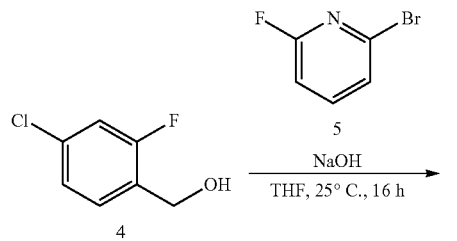 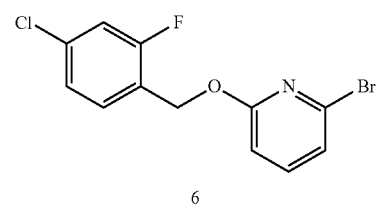 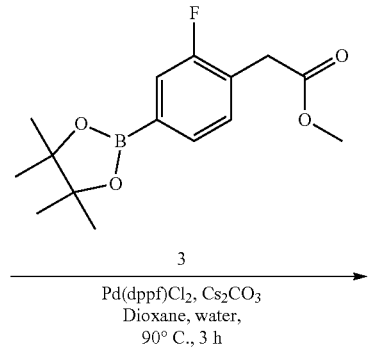
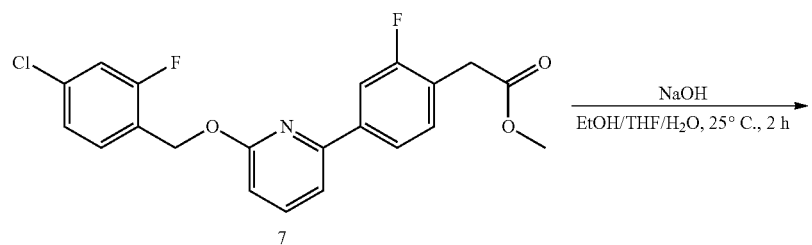
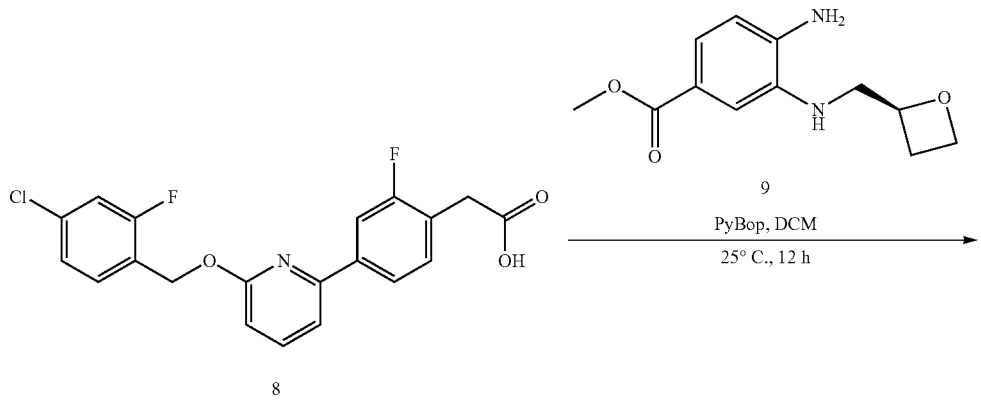
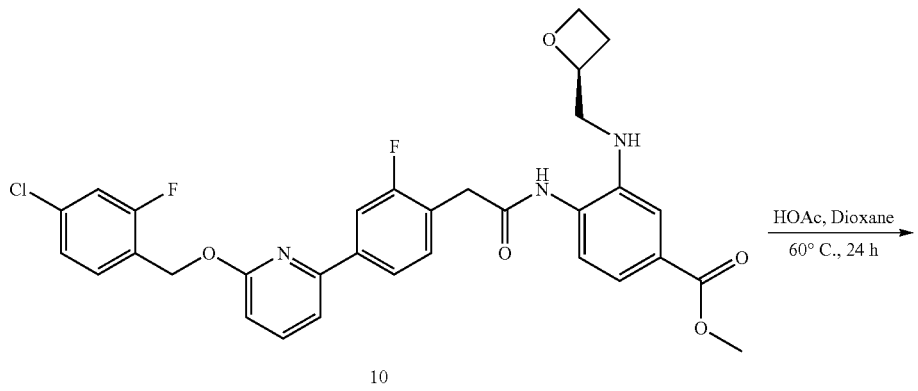

-continued

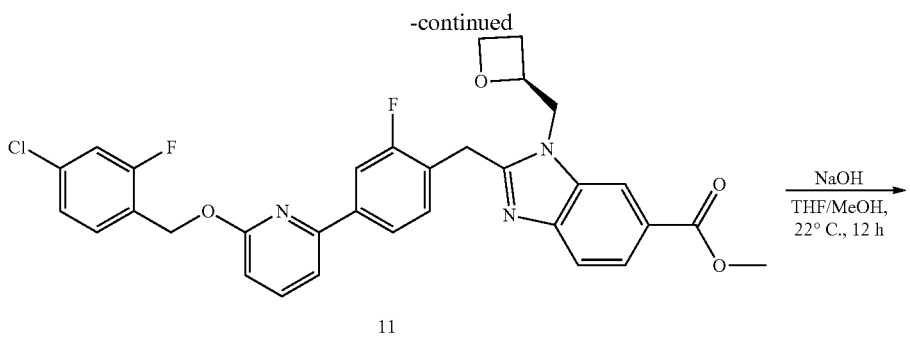

11

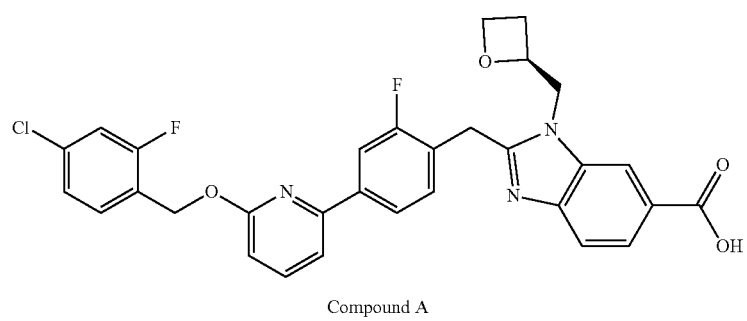

Compound A

Step 1

To a solution of 2-(4-bromo-2-fluoro-phenyl)acetic acid (100 g, 429.12 mmol) in methanol (300 mL) was added sulfuric acid (11.5 mL, 98% purity) at 5° C. The solution was heated to reflux for 8 h. The mixture was cooled to r.t. and concentrated the solvent under reduced pressure at 40° C. to no obvious distillate, diluted with EA (500 mL) and washed with water (200 mL) twice and saturated $NaHCO_3$ solution to fully neutralize the $H_2SO_4$. The combined organic was washed with brine and dried with $Na_2SO_4$ and $MgSO_4$. The organic layer was filtered through a short pad of silica gel and concentrated the combined organic filtrate to obtain the desired ester (104 g, 98.1%) without further purification.

$^1$H NMR (400 MHz, $CDCl_3$) δ7.30-7.25 (m, 2H), 7.20 (t, 1H), 3.70 (s, 3H), 3.63 (s,1H).

Step 2

To a three-neck bottle was added sequentially methyl 2-(4-bromo-2-fluoro-phenyl)acetate (150 g, 607.14 mmol), 4,4,5,5-tetramethyl-2-(4,4,5,5-tetramethyl-1,3,2-dioxaborolan-2-yl)-1,3,2-dioxaborolane (185.01 g, 728.57 mmol), potassium; acetate (119.17 g, 1.21 mol) and cyclopentyl (diphenyl)phosphane; dichloropalladium; iron (6.66 g, 9.11 mmol). The bottle was vacuumed and inflated with $N_2$ for two times. 1,4-Dioxane (750 mL) was added, and the mixture was vacuumed and inflated with $N_2$ once before it was heated at 100° C. for 2 h. The reaction mixture was cooled to r.t. and filtered through a pad of Celite and then concentrated under vacuum at 35° C. to no obvious distillate. The residue was diluted with PE/EA=4/1 (600 mL/150 mL) and filtered through a pad of silica gel (200 mesh) and washed with PE/EA=4/1 (360 mL/90 mL). The filtrate was concentrated to no obvious distillate to obtain the crude Bpin ester (calculated as 158.9 g in purity, 89% yield) and used directly without further purification.

LCMS: $[M+H]^+$=294.9

Step 3

To a solution of (4-chloro-2-fluoro-phenyl)methanol (100 g, 622.77 mmol) (1.0 eq), 2-bromo-6-fluoro-pyridine (109.60 g, 622.77 mmol, 64.09 mL) in THF (500 mL) was added sodium; hydroxide (32.38 g, 809.60 mmol, 15.20 mL) under $N_2$ protection at 25±5° C. The mixture was stirred for 16 h. HOAc (0.3 eq) was added to the system for 0.5 h. DMF (500 mL) was added to the system and concentrated to no obvious distillate under vacuum at 40° C. Water (500 mL) was added to the system, filtered, washed the cake with water (300 mL), collected the filter cake. The cake was dried at 45±5° C. under vacuum for 16 h. The product was obtained as off-white to white solid (182.3 g, 92.5%).

LCMS: $[M+H]^+$=317.6

Step 4

To a three-neck bottle were added sequentially 2-bromo-6-[(4-chloro-2-fluoro-phenyl)methoxy]pyridine (171.0 g, 0.54 mol), dicesium; carbonate (352.1 g, 1.1 mol) and cyclopentyl(diphenyl)phosphane; dichloropalladium; iron (3.95 g, 5.4 mmol). The bottle was vacuumed and inflated with $N_2$ for two times. A solution of the above prepared Bpin ester in 1,4-Dioxane (780 mL) and water (195 mL) were added successively, and the mixture was vacuumed and inflated with $N_2$ once before it was heated at 90° C. for 3 h. The reaction mixture was cooled to r.t. and filtered through a pad of Celite. The resultant mixture was extracted with EtOAc (3×1000 mL).

The combined organic phases were washed with brine (400 mL), dried over anhydrous $Na_2SO_4$, and filtered. After removal of the volatile under vacuum, the residue was diluted with PE/EA=3/1 (600 mL/200 mL) and filtered through a pad of silica gel (2 W, 200 mesh) and washed with PE/EA=4/1 (800 mL/200 mL). The filtrate was concentrated to obtain the crude ester for further purification.

LCMS: $[M+H]^+=403.7$

Step 5

To a stirred solution of methyl 2-[4-[6-[(4-chloro-2-fluoro-phenyl)methoxy]-2-pyridyl]-2-fluoro-phenyl]acetate (150 g, 371.47 mmol) in THF/EtOH=900 mL/300 mL was added dropwise a solution of sodium; hydroxide (29.72 g, 742.93 mmol) in water (300 mL) maintaining the temperature at 25° C. The reaction mixture was stirred at 25° C. for 2 h before it was treated with a solution of HOAc (42.5 mL) in water (300 mL) at 25° C. The resulting suspension was concentrated till no obvious distill. The white solid was filtered, washed with water (2×600 mL) and slurred with DMF/water=1/1 (450 mL/450 mL) to give the desired acid (137.5 g, 94.8%).

LCMS: $[M+H]^+=389.7$

Step 6

To a stirred suspension of 2-[4-[6-[(4-chloro-2-fluoro-phenyl)methoxy]-2-pyridyl]-2-fluoro-phenyl]acetic acid (117.8 g, 272.00 mmol), methyl 4-amino-3-[[(2S)-oxetan-2-yl]methylamino]benzoate (67.65 g, 272.00 mmol) and benzotriazol-1-yloxy(tripyrrolidin-1-yl)phosphonium; hexafluorophosphate (162.78 g, 312.80 mmol) in DCM (590 mL) was added a solution of N-ethyl-N-isopropyl-propan-2-amine (52.73 g, 408.00 mmol, 71.06 mL) in DCM (120 mL) at 10° C. The reaction mixture was gradually warmed to 25° C. and stirred for 12 h before it was quenched 5% aqueous NaHCO₃ (480 mL) and stirred for 2 h. The organic phase was washed with brine (240 mL), dried over anhydrous Na₂SO₄, filtered. The filtrate was passed through a pad of silica gel (200 mesh), washed with PE/EA=2/1 (200 mL/100 mL) and concentrated under vacuum. The residue was slurred with PE/EA=3/1 (300 mL/100 mL) and filtered to obtain the amination product (165.4 g, 90.0%).

LCMS: $[M+H]^+=607.7$

Step 7

A suspension of methyl 4-[[2-[4-[6-[(4-chloro-2-fluoro-phenyl)methoxy]-2-pyridyl]-2-fluoro-phenyl]acetyl]amino]-3-[[(2S)-oxetan-2-yl]methylamino]benzoate (15.8 g, 25.99 mmol) in dioxane (75 mL) was heated to 60° C. to obtain a solution. To the solution was added a solution of acetic acid (7.80 g, 129.93 mmol, 7.43 mL) in dioxane (15 mL) at 60° C. The resulting solution was heated at 60° C. for 24 h before it was cooled to 25° C. and quenched with 5% aqueous NaHCO₃ (218 mL). The resulting precipitate was slurred in the dioxane/water system for 4 h and filtered to obtain the crude cyclization product. The crude product was recrystallized in EtOAc/PE=1/2 (50 mL/100 mL) after cooling from 78° C. to 25° C. to obtain the pure product (14.6 g, 95.2%).

LCMS: $[M+H]^+=589.7$

Step 8

To a stirred solution of methyl 2-[[4-[6-[(4-chloro-2-fluoro-phenyl)methoxy]-2-pyridyl]-2-fluoro-phenyl]methyl]-3-[[(2S)-oxetan-2-yl]methyl]benzimidazole-5-carboxylate (20 g, 33.90 mmol) in THF/MeOH=120 mL/40 mL was added dropwise a solution of sodium; hydroxide in water (40 mL) maintaining the temperature at 22° C. The reaction mixture was stirred at 22° C. for 12 h before it was treated with a solution of HOAc (7.9 mL) in water (40 mL, 2V) at 22° C. The resulting white solid was filtered, washed with water (2×100 mL) and crystallized with THF/water=2/1 (200 mL/100 mL) to give the desired acid Compound A (19.0 g, 97.3%). Compound A was slurred in acetone at 22° C. for 48 h, filtered then dried at 45±5° C. under vacuum for 48 h to give Form I of Compound A.

LCMS: $[M+H]^+=575.7$

¹H NMR (400 MHz, DMSO-d6) δ8.23 (brs, 1H), 7.96-7.75 (m, 4H), 7.76-7.56 (m, 3H), 7.50 (dd, 1H), 7.42 (t, 1H), 7.31 (dd, 1H), 6.87 (d, 1H), 5.51 (s, 2H), 5.04 (d, 1H), 4.71 (dd, 1H), 4.58 (d, 1H), 4.56-4.45 (m, 2H), 4.42-4.35 (m, 2H), 2.71-2.66 (m, 1H), 2.39-2.36 (m,1H).

Example 2. Preparation and Characterization of Crystalline Form I of Compound A Free Acid 2.1.1 Preparation Method 1

About 300 mg of free acid of Compound A (amorphous) was added into 12 mL acetone to form a suspension. The suspension was kept stirring in a 20 mL vial at ~20° C. for ~40 hours (Magnetically stirred). Solids were collected by filtration and dried under vacuum at 40° C. for 4 hours. About 250 mg of free acid Form I was obtained.

2.1.2 Preparation Method 2

About 20 mg of free acid of Compound A (amorphous) was added into 1 mL solvent (acetone, toluene, ethanol or methyl tert-butyl ether) to make suspension. The suspension was kept stirring at ~20° C. for 3 days (Magnetically stirred). Solid samples were collected by filtration and Form I was obtained.

2.1.3 Preparation Method 3

About 20 mg of free acid of Compound A (amorphous) was added into 0.5 mL methyl ethyl ketone to make suspension. The suspension was kept stirring at ~22° C. for 1 week (magnetic stirring). Solid samples were collected by filtration and Form I was obtained.

2.1.4 Preparation Method 4

About 20 mg of free acid of Compound A (amorphous) was added into 0.5 mL 2-methyltetrahydrofuran to make suspension. The suspension was kept stirring at ~22° C. for 1 week (magnetic stirring). Solid samples were collected by filtration and Form I was obtained.

2.1.5 Preparation Method 5

About 20 mg of free acid of Compound A (amorphous) was added into 0.5 mL IPA to make suspension. The suspension was kept stirring at ~50° C. for 1 week (magnetic stirring). Solid samples were collected by filtration and Form I was obtained.

2.2 Characterization

Figure 2:
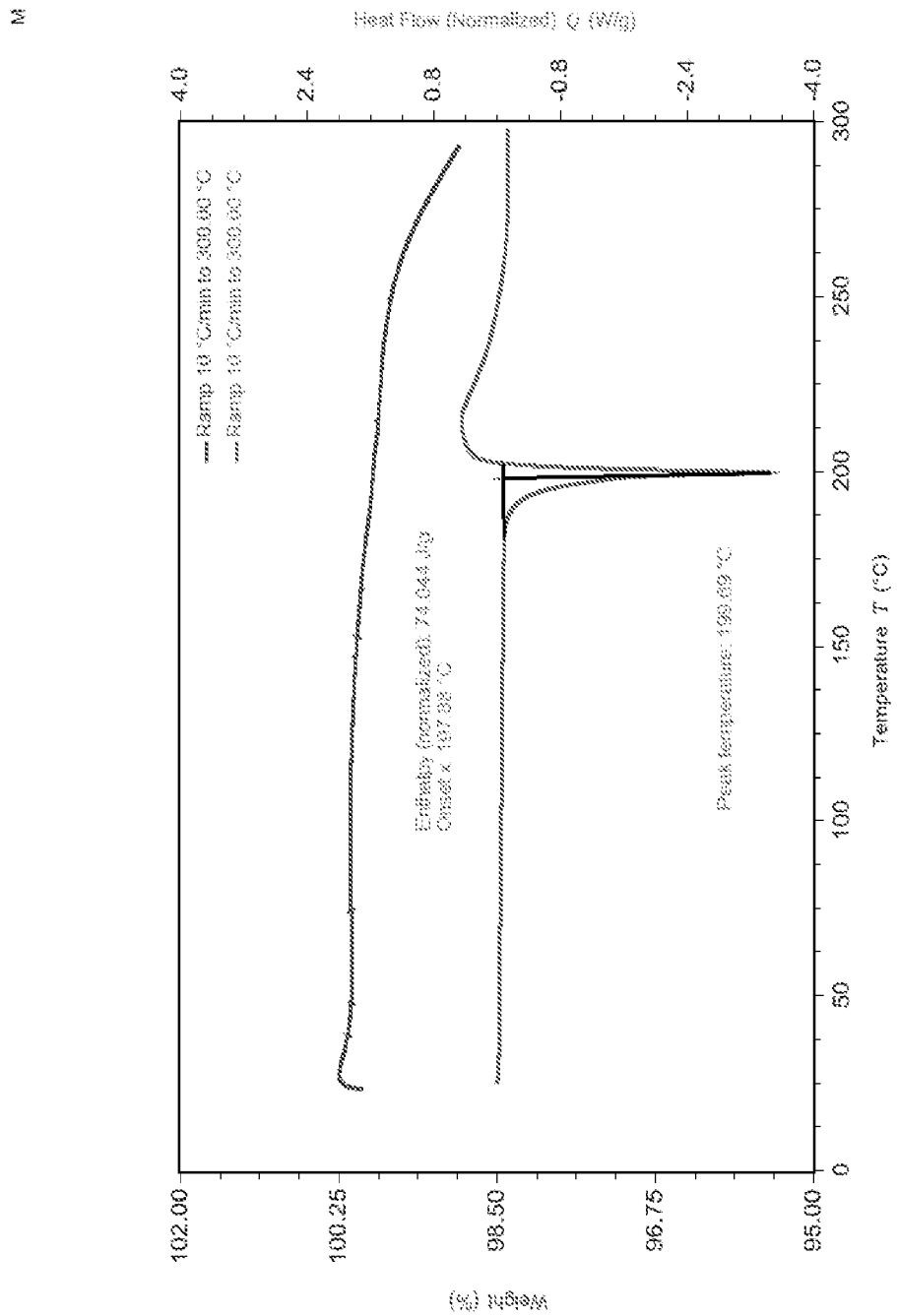
FIG. 2 shows the Thermogravimetric Analysis (TGA) thermogram and the Differential Scanning calorimetry Analysis (DSC) thermogram of crystalline form I of Compound A free acid.
Figure 3:
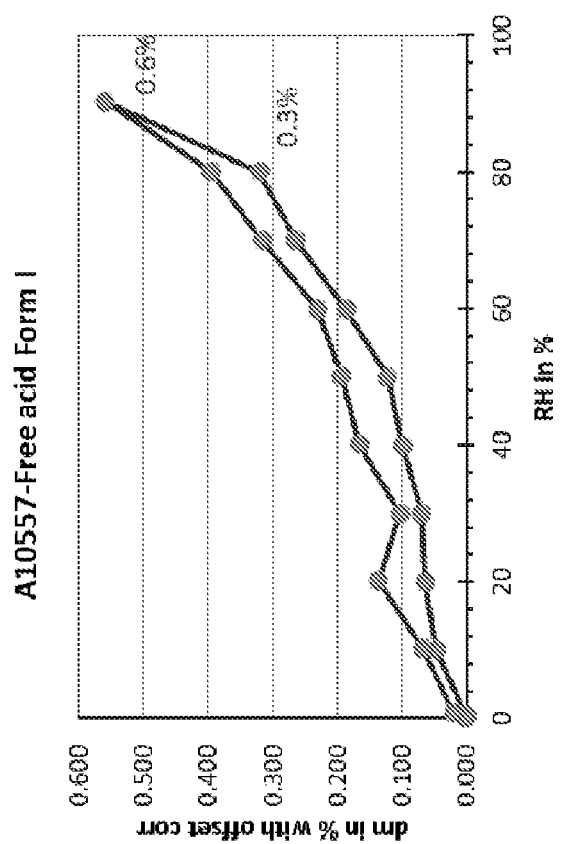
FIG. 3 shows the Dynamic Vapor Sorption (DVS) results of crystalline form I of Compound A free acid.

The product obtained from preparation method 1 was characterized by XRPD (FIG. 1), TGA, DSC (FIG. 2), DVS (FIG. 3), and ¹H-NMR.

It shows that free acid Form I is an anhydrate. No organic solvent was detected by ¹H-NMR. TGA did not show significant weight loss before 150° C. DSC showed one endothermic peak at 200° C., which was associated with melting of the sample. DVS data (FIG. 3) showed ~0.3% weight change from 0 to 80% RH and 0.6% to 90% RH, suggesting free acid Form I is slightly hygroscopic. The crystal form of free acid Form I remained unchanged after DVS test. The characterization results of free acid form I is summarized in Table 1. The XRPD peaks are summarized in Table 2.

TABLE 1

Characterization Results of Free Acid Form I

| Sample | DSC, endo Onset/Peak (° C.), ΔH (J/g) | TGA wt loss %/ @T (° C.) | DVS (0-80/ 90% RH) | Comment |
|---|---|---|---|---|
| Free Acid Form I | 198/200, 74 | ~0/RT-150 | ~0.3/0.6 Slightly Hygroscopic | No organic solvent |

TABLE 2

XRPD of Crystalline Form I of Free Acid Compound A Form I

| 2-Theta | I % (Height) |
|---|---|
| 4.865 | 37.1 |
| 6.360 | 10.8 |
| 7.648 | 9.4 |
| 9.736 | 16.4 |
| 11.377 | 41.4 |
| 11.797 | 55 |
| 12.730 | 89.8 |
| 14.608 | 10 |
| 15.303 | 6.1 |
| 15.763 | 18.1 |
| 18.073 | 100 |
| 18.323 | 61.6 |
| 18.822 | 24 |
| 19.557 | 12.4 |
| 20.594 | 8.6 |
| 21.527 | 29.5 |
| 21.932 | 6.3 |
| 23.011 | 23.9 |
| 23.339 | 20 |
| 24.810 | 15.9 |
| 26.712 | 11.2 |
| 27.935 | 3.7 |
| 28.670 | 11.9 |
| 30.797 | 3.7 |
| 31.674 | 2.4 |
| 32.685 | 2 |
| 36.193 | 2 |
| 37.112 | 2.2 |
| 37.886 | 1.6 |

Example 3. Solubility Measurement of Crystalline Form I of Compound A Free Acid

The solubility of free acid Form I was tested in bio-relevant media (Simulated Gastric Fluid (SGF), Fasted-State Simulated Intestinal Fluid (FaSSIF) and Fed-State Simulated Intestinal Fluid (FeSSIF)) at 37° C. for up to 24 hours. About 15 mg of the sample was weighed into sample vial, and then 5.0 mL of bio-relevant media was added to make suspension. All suspensions prepared were shaken @ 600 rpm with a QQMSC-100 shaker at 37° C. At 0.5, 2 and 24 hours, about 1000 μL of each suspension was filtered and diluted, and then the filtrate was analyzed by HPLC to test the solubility. The pH of the filtrate was measured, and the filter cake was analyzed by XRPD.

Free acid Form I was insoluble in SGF. Solubility study showed that the concentration of free acid in FaSSIF and FeSSIF were ~5 and 10 μg/mL at 0.5 h. The XRPD pattern of free acid Form I was not changed after solubility study. The results are summarized in Table 3.

TABLE 3

Results of Solubility Test in Bio-relevant Media

| Sample | Media | Solubility (μg/mL) 0.5 h | 2 h | 24 h | XRPD (24 h) | pH (0 h) | pH (24 h) |
|---|---|---|---|---|---|---|---|
| Free Acid Form I | SGF | ND | ND | ND | Unchanged | 1.20 | 0.93 |
| | FeSSIF | 10 | 17 | 11 | Unchanged | 4.99 | 4.95 |
| | FaSSIF | 5 | 6 | 15 | Unchanged | 6.50 | 6.45 |

Example 4. Solid-State Stability Study of Crystalline Form I of Compound A Free Acid About 25 mg of free acid Form I was placed at 60° C./capped and 40° C./75% RH (open) conditions for up to 12 days. At day 0 and 7, the sample was dissolved in diluent to prepare 0.5 mg/mL solution for HPLC purity analysis. Solid samples were analyzed by XRPD to check the crystal form at day 12.

The results are summarized in Table 4. Free acid Form I was physically and chemically stable at 60° C./capped and 40° C./75% RH for 12 days.

TABLE 4

Stability Evaluation Results

| Sample | Initial Purity (Area %) | Purity-1 week (Area %) 60° C./ Capped, 1 week | 40° C./ 75% RH, 1 week | XRPD-12 days 40° C./ 75% RH | 60° C./ Capped |
|---|---|---|---|---|---|
| Free Acid Form I | 99.58 | 99.54 | 99.56 | Unchanged | Unchanged |

Example 5. Preparation and Characterization of Crystalline Form II of Compound A Free Acid 5.1.1 Preparation Method 1

About 20 mg of free acid of Compound A (amorphous) was added into 1 mL acetonitrile to make suspension. The suspension was kept stirring at ~20° C. for 3 days. Solid samples were collected by filtration and Form II was obtained.

5.1.2 Preparation Method 2

About 20 mg of free acid of Compound A (amorphous) was added into 0.5 mL isopropyl acetate to make suspension. The suspension was kept stirring at ~50° C. for 1 week. Solid samples were collected by filtration and Form II was obtained.

5.2 Characterization

Figure 5:
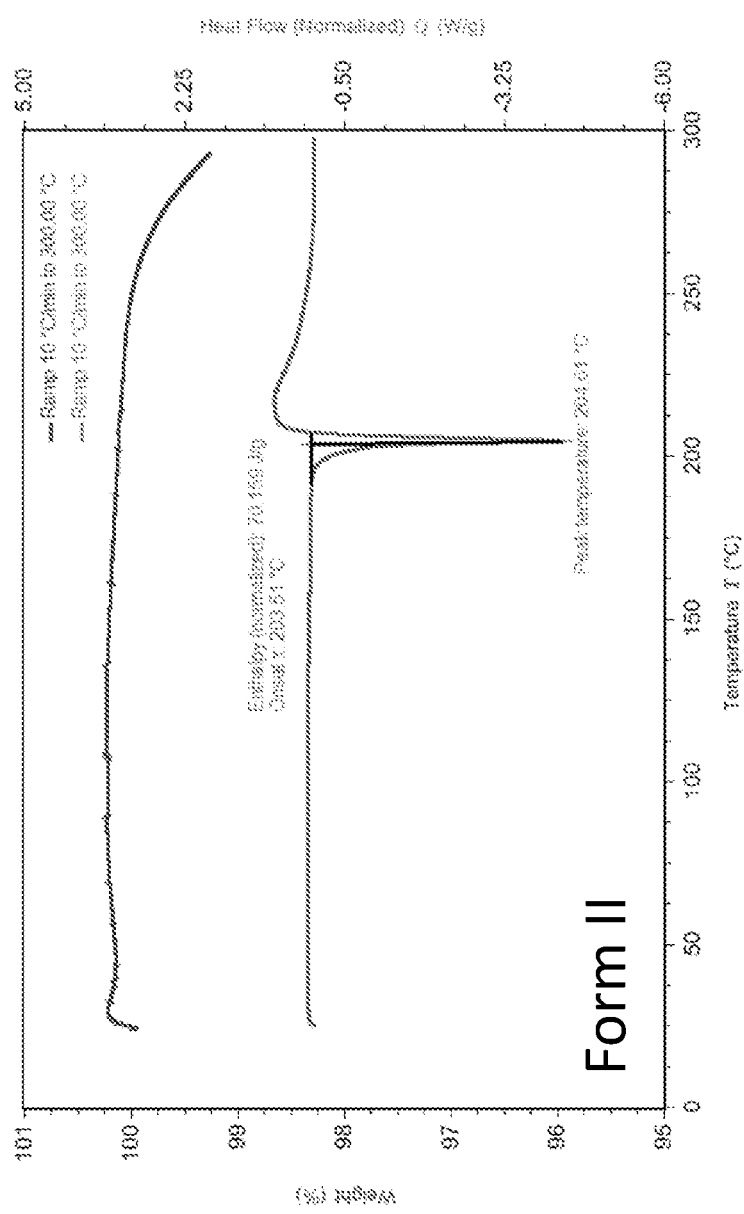
FIG. 5 shows the Thermogravimetric Analysis (TGA) thermogram and the Differential Scanning calorimetry Analysis (DSC) thermogram of crystalline form II of Compound A free acid.

The obtained product was characterized by XRPD (FIG. 4), TGA, DSC (FIG. 5), DVS, and $^1$H-NMR.

It shows that free acid Form II is an anhydrate. There was almost no weight loss before 100° C. An endothermic peak at ~205° C. was detected, which was associated with melting of the sample. The XRPD peaks are summarized in Table 5.

TABLE 5

XRPD of Crystalline Form II
of Free Acid Compound A
Form II

| 2-Theta | I % (Height) |
|---|---|
| 4.877 | 27.7 |
| 7.700 | 9.2 |
| 9.698 | 12.6 |
| 11.416 | 28.8 |
| 11.954 | 45.4 |
| 12.887 | 62.1 |
| 14.608 | 7.9 |
| 15.382 | 4.9 |
| 15.802 | 18.4 |
| 18.598 | 76.3 |
| 18.914 | 13.4 |
| 19.492 | 7.6 |
| 20.411 | 100 |
| 23.207 | 11.5 |
| 23.995 | 4.2 |
| 24.455 | 13.4 |
| 25.215 | 1.5 |
| 25.938 | 11.7 |
| 26.66 | 1.8 |
| 27.185 | 2.2 |
| 28.183 | 2.8 |
| 30.519 | 1.8 |
| 31.070 | 3.1 |
| 31.649 | 2.8 |
| 36.653 | 3.9 |

TABLE 6

XRPD of Crystalline Form III
of Free Acid Compound A
Form III

| 2-Theta | I % (Height) |
|---|---|
| 5.242 | 1.7 |
| 8.607 | 1.5 |
| 9.105 | 8.8 |
| 9.787 | 62.8 |
| 10.446 | 2.3 |
| 11.706 | 24.1 |
| 12.348 | 2.1 |
| 13.294 | 38.9 |
| 14.227 | 27.6 |
| 14.581 | 3.9 |
| 15.293 | 2.1 |
| 15.671 | 6.1 |
| 17.313 | 85 |
| 17.599 | 8.3 |
| 18.152 | 100 |
| 19.476 | 12.2 |
| 20.015 | 0.9 |
| 20.634 | 9.7 |
| 21.238 | 8.7 |
| 21.921 | 7.9 |
| 22.472 | 12.3 |
| 22.984 | 7.8 |
| 23.485 | 6.5 |
| 24.086 | 11.5 |
| 24.284 | 9.7 |
| 24.705 | 24.3 |
| 25.848 | 7.2 |
| 26.279 | 19.5 |
| 26.646 | 6.7 |
| 27.029 | 8.5 |
| 27.685 | 26.1 |
| 28.077 | 3.5 |
| 28.631 | 3.8 |
| 29.366 | 2.5 |
| 29.670 | 2.7 |
| 30.088 | 4.8 |
| 30.979 | 9.9 |
| 31.649 | 4.7 |
| 31.900 | 7 |
| 32.820 | 6.1 |
| 33.438 | 1.7 |
| 33.895 | 2 |
| 35.075 | 4.5 |
| 35.564 | 1.5 |
| 35.956 | 2.2 |
| 36.666 | 1.6 |
| 37.375 | 1.3 |
| 38.189 | 1.7 |

Example 6. Preparation and Characterization of Crystalline Form III of Compound A Free Acid 6.1.1 Preparation Method 1

About 20 mg of free acid of Compound A (amorphous) was added into 1 mL methanol to make suspension. The suspension was kept stirring at ~20° C. for 3 days. Solid samples were collected by filtration and Form III was obtained.

6.1.2 Preparation Method 2

About 20 mg of free acid of Compound A (amorphous) was added into 1 mL water to make suspension. The suspension was kept stirring at ~20° C. for 3 days. Solid samples were collected by filtration and Form III was obtained.

6.1.3 Preparation Method 3

About 20 mg of Form I of Compound A free acid was dissolved in 0.2 mL of DMF to obtain a clear solution. After filtration, the drug solution was added dropwise into 1 mL of water. Solid samples were collected by filtration and Form III was obtained.

6.2 Characterization

Figure 7:
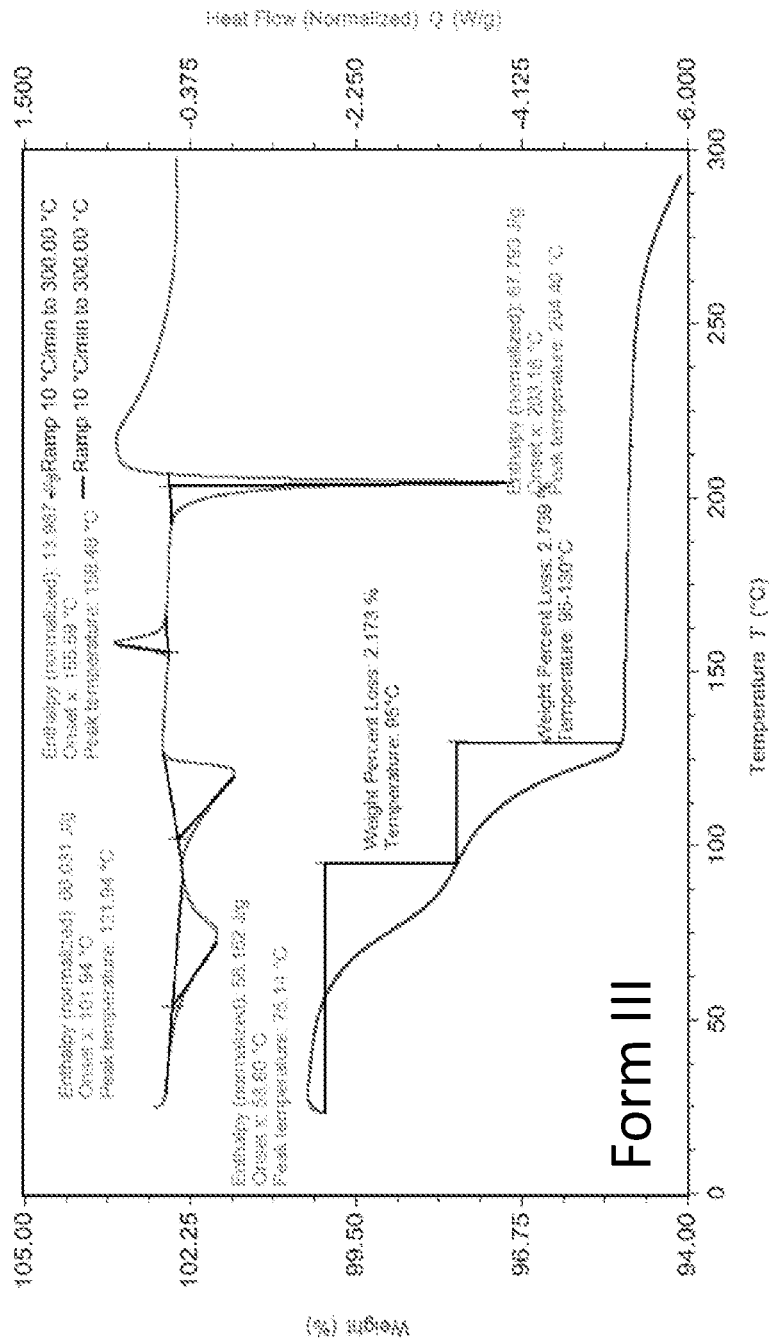
FIG. 7 shows the Thermogravimetric Analysis (TGA) thermogram and the Differential Scanning calorimetry Analysis (DSC) thermogram of crystalline form III of Compound A free acid.

The obtained product was characterized by XRPD (FIG. 6), TGA, DSC (FIG. 7), and $^1$H-NMR.

It shows that free acid Form III is a hydrate. Only 0.1% MeOH was detected by NMR; There was ~4.9% weight loss before 130° C. (~1.6 eq. H$_2$O), which may due to dehydration. Multiple thermal events were observed in DSC curve. An exothermic peak at ~160° C. followed by an endothermic peak was detected, indicating a phase transition upon heating. The XRPD peaks are summarized in Table 6.

Example 7. Preparation and Characterization of Crystalline Form IV of Compound A Free Acid 7.1 Preparation Method About 30 mg of Form I of Compound A free acid was added into 0.4 mL EA to make suspension. The suspension was kept stirring at ~50° C. for 5 days. Solid samples were collected by filtration and Form IV was obtained.

7.2 Characterization

Figure 9:
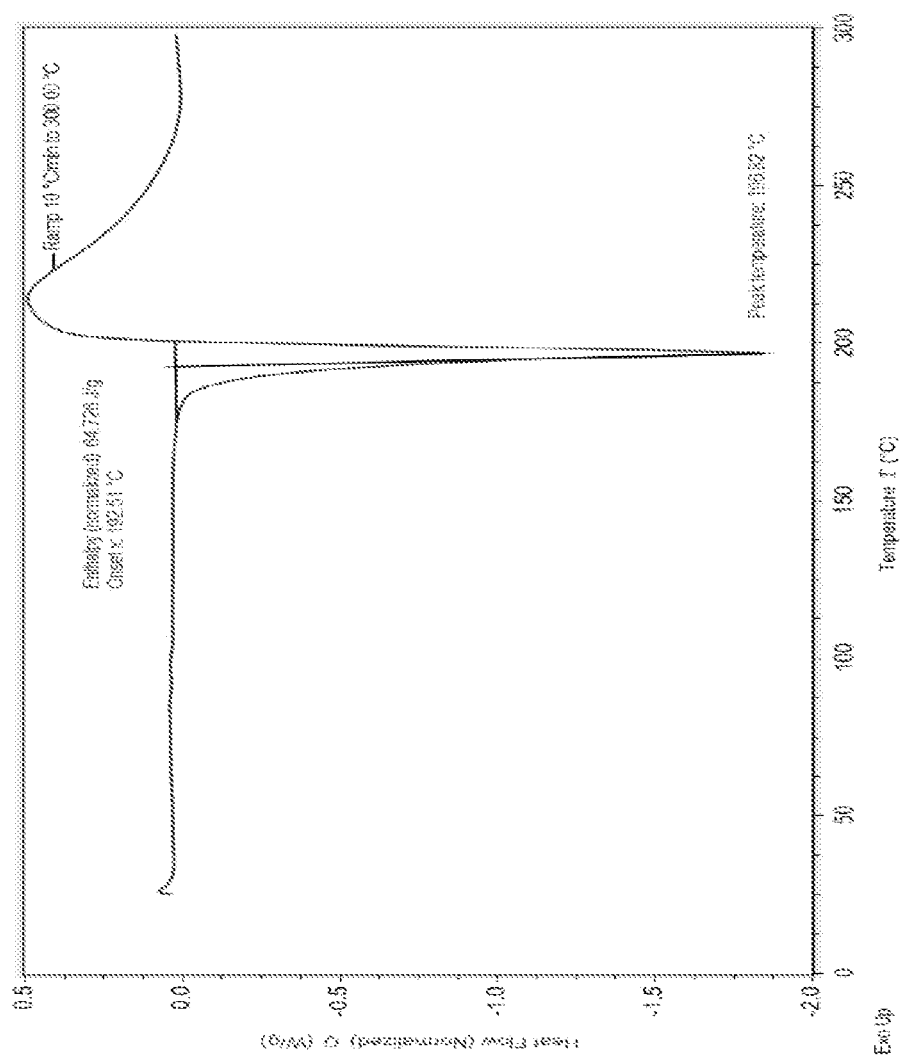
FIG. 9 shows the Differential Scanning calorimetry Analysis (DSC) thermogram of crystalline form IV of Compound A free acid.
Figure 10:
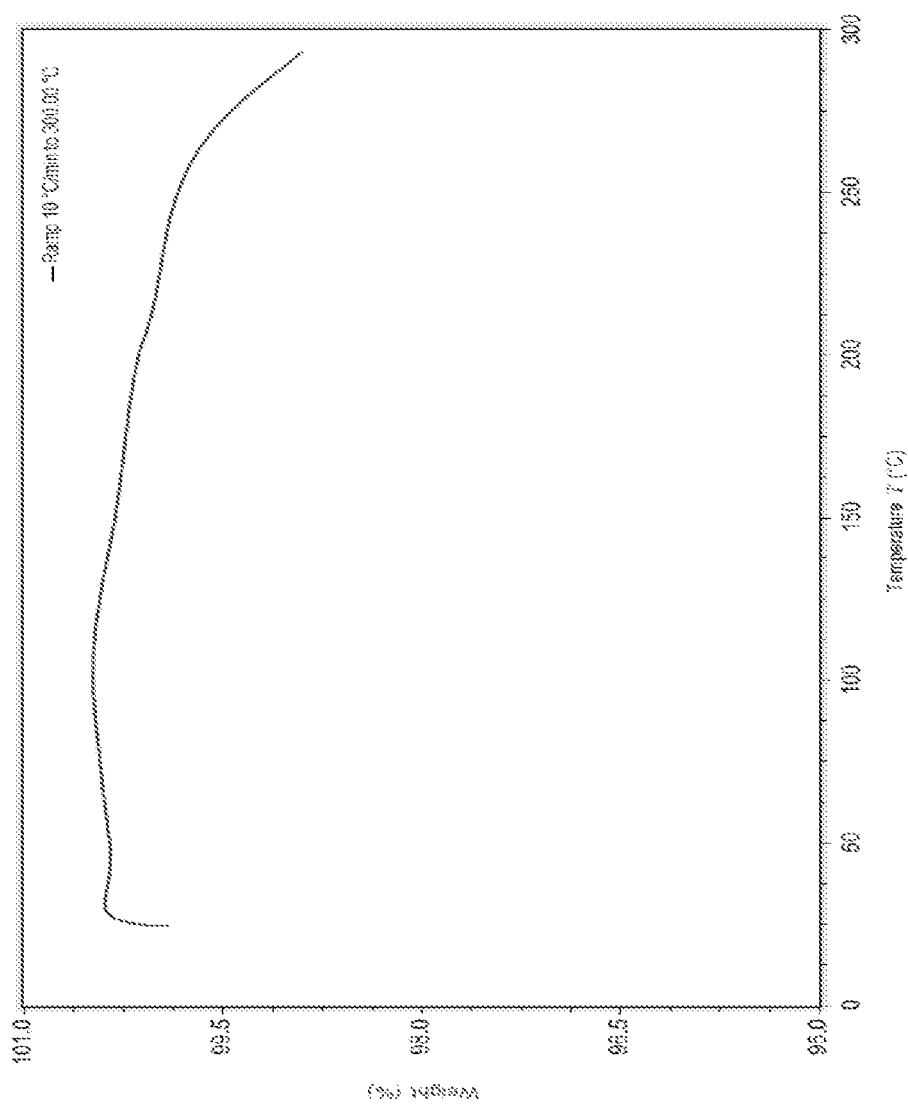
FIG. 10 shows the Thermogravimetric Analysis (TGA) thermogram of crystalline form IV of Compound A free acid.

The obtained product was characterized by XRPD (FIG. 8), DSC (FIG. 9), TGA (FIG. 10), and $^1$H-NMR.

It shows that free acid Form IV is an anhydrate. No organic solvent was detected by $^1$H-NMR. TGA did not show significant weight loss before 150° C. DSC showed one endothermic peak at 196.8° C., which was associated with melting of the sample. The XRPD peaks are summarized in Table 7.

TABLE 7

XRPD of Crystalline Form IV
of Free Acid Compound A
Form IV

| 2-Theta | I % (Height) |
|---|---|
| 4.762 | 42.9 |
| 5.377 | 24.8 |
| 6.547 | 22.8 |
| 7.217 | 21.8 |
| 7.91 | 41.8 |
| 8.883 | 26.1 |
| 9.395 | 18 |
| 9.67 | 23.5 |
| 10.445 | 35.8 |
| 10.825 | 79.6 |
| 11.837 | 100 |
| 13.228 | 96.5 |
| 14.499 | 25 |
| 14.829 | 18.3 |
| 15.132 | 42.4 |
| 16.287 | 51.4 |
| 16.954 | 17.8 |
| 17.796 | 74.9 |
| 18.559 | 78.7 |
| 19.4 | 38.3 |
| 19.741 | 78.2 |
| 20.804 | 54.1 |
| 21.422 | 40.4 |
| 21.988 | 31.6 |
| 22.92 | 69.5 |
| 23.406 | 19.3 |
| 24.938 | 17.2 |
| 25.716 | 19.4 |
| 26.345 | 43.5 |
| 26.623 | 67.7 |
| 28.21 | 45 |
| 28.42 | 45.3 |

What is claimed is:

1. A crystalline Form I of Compound A,

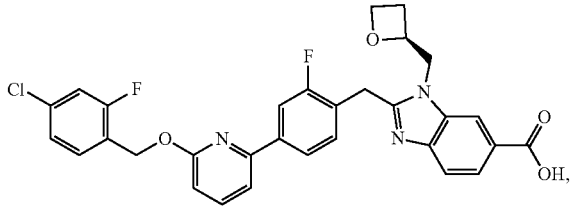

Compound A characterized by an X-ray powder diffraction (XRPD) pattern which comprises peaks selected from 11.4°, 12.7°, 18.1°, and 18.3°±0.2 in 2θ.

2. The crystalline Form I of claim 1, wherein the X-ray powder diffraction pattern further comprises one or more peaks at 4.9°, 11.8°, and 21.5°±0.2 in 2θ.

3. The crystalline Form I of claim 2, wherein the X-ray powder diffraction pattern further comprises one or more peaks at 15.8°, 18.8°, and 23.0°±0.2 in 2θ.

4. The crystalline Form I of claim 1, wherein the X-ray powder diffraction pattern comprises peaks at 4.9°, 11.4°, 11.8°, 12.7°, 15.8°, 18.1°, 18.3°, 18.8°, 21.5°, and 23.0°±0.2 in 2θ.

5. The crystalline Form I of claim 1, characterized by a differential scanning calorimeter (DSC) peak phase transition temperature of 200±3° C.

6. The crystalline Form I of claim 1, wherein at least 90% by weight of the Compound A is crystalline Form I.

7. A crystalline Form II of Compound A,

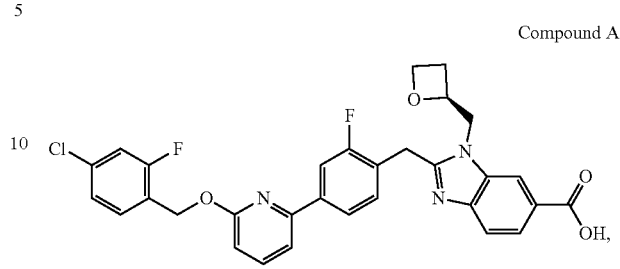

Compound A characterized by an X-ray powder diffraction pattern which comprises peaks selected from 11.4°, 12.0°, 12.9°, 18.6°, and 20.4°±0.2 in 2θ.

8. The crystalline Form II of claim 7, wherein the X-ray powder diffraction pattern does not comprise peaks at 18.1° and/or 21.5°±0.2 in 2θ.

9. The crystalline Form II of claim 8, wherein the X-ray powder diffraction pattern further comprises one or more peaks at 4.9°, 7.7°, 15.8°, and 25.9°±0.2 in 2θ.

10. The crystalline Form II of claim 7, characterized by an X-ray powder diffraction pattern which comprises peaks at 4.9°, 7.7°, 11.4°, 12.0°, 12.9°, 15.8°, 18.6°, 20.4°, and 25.9°±0.2 in 2θ.

11. The crystalline Form II of claim 7, characterized by a differential scanning calorimeter (DSC) peak phase transition temperature of 205±3° C.

12. The crystalline Form II of claim 7, wherein at least 90% by weight of the Compound A is crystalline Form II.

13. A crystalline Form III of Compound A,

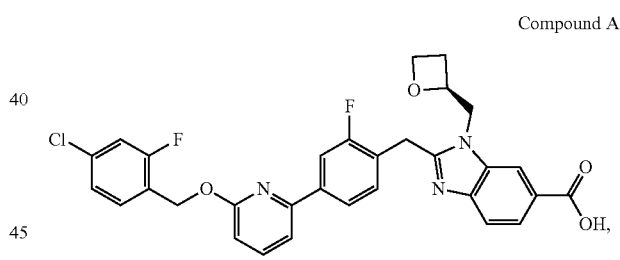

Compound A characterized by an X-ray powder diffraction pattern which comprises peaks selected from 9.8°, 13.3°, 17.3°, and 18.1°±0.2 in 2θ.

14. The crystalline Form III of claim 13, wherein the X-ray powder diffraction pattern further comprises one or more peaks at 11.7°, 14.2°, 24.7°, 26.3 and 27.7°±0.2 in 2θ.

15. The crystalline Form III of claim 13, wherein the crystalline Form III is characterized by an X-ray powder diffraction pattern which comprises peaks at 9.8°, 11.7°, 13.3°, 14.2°, 17.3°, 18.1°, 24.7°, 26.3°, and 27.7°±0.2 in 2θ.

16. The crystalline Form III of claim 13, characterized by a differential scanning calorimeter (DSC) peak phase transition temperature of 204±3° C.

17. The crystalline Form III of claim 13, wherein the crystalline Form III is hydrate.

18. The crystalline Form III of claim 13, wherein at least 90% by weight of the Compound A is crystalline Form III.

19. A pharmaceutical composition comprising a crystalline form of Compound A of claim 1, and a pharmaceutically acceptable carrier.

20. A method of treating or preventing a disease or condition, the method comprising administering to a subject in need of treatment a therapeutically effective amount of a crystalline form of Compound A of claim 1, or a pharmaceutical composition thereof, wherein the disease or condition is T1D, T2DM, pre-diabetes, idiopathic T1D, LADA, EOD, YOAD, MODY, malnutrition-related diabetes, gestational diabetes, hyperglycemia, insulin resistance, hepatic insulin resistance, impaired glucose tolerance, diabetic neuropathy, diabetic nephropathy, kidney disease, diabetic retinopathy, adipocyte dysfunction, visceral adipose deposition, sleep apnea, obesity, eating disorders, weight gain from use of other agents, excessive sugar craving, dyslipidemia, hyperinsulinemia, NAFLD, NASH, fibrosis, cirrhosis, hepatocellular carcinoma, cardiovascular disease, atherosclerosis, coronary artery disease, peripheral vascular disease, hypertension, endothelial dysfunction, impaired vascular compliance, congestive heart failure, myocardial infarction, stroke, hemorrhagic stroke, ischemic stroke, traumatic brain injury, pulmonary hypertension, restenosis after angioplasty, intermittent claudication, post-prandial lipemia, metabolic acidosis, ketosis, arthritis, osteoporosis, Parkinson's Disease, left ventricular hypertrophy, peripheral arterial disease, macular degeneration, cataract, glomerulosclerosis, chronic renal failure, metabolic syndrome, syndrome X, premenstrual syndrome, angina pectoris, thrombosis, atherosclerosis, transient ischemic attacks, vascular restenosis, impaired glucose metabolism, conditions of impaired fasting plasma glucose, hyperuricemia, gout, erectile dysfunction, skin and connective tissue disorders, psoriasis, foot ulcerations, ulcerative colitis, hyper apo B lipoproteinemia, Alzheimer's Disease, schizophrenia, impaired cognition, inflammatory bowel disease, short bowel syndrome Crohn's disease, colitis, irritable bowel syndrome, Polycystic Ovary Syndrome, or addiction.

\* \* \* \* \*